(12) United States Patent
Collins

(10) Patent No.: US 11,746,939 B2
(45) Date of Patent: Sep. 5, 2023

(54) BLIND MATE FLUID CONNECTOR

(71) Applicant: Rivian IP Holdings, LLC, Plymouth, MI (US)

(72) Inventor: Tyler Collins, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 162 days.

(21) Appl. No.: 16/683,010

(22) Filed: Nov. 13, 2019

(65) Prior Publication Data

US 2020/0149667 A1    May 14, 2020

Related U.S. Application Data

(60) Provisional application No. 62/760,490, filed on Nov. 13, 2018.

(51) Int. Cl.
*F16L 27/00* (2006.01)

(52) U.S. Cl.
CPC .................................. *F16L 27/00* (2013.01)

(58) Field of Classification Search
CPC ..... F16L 37/142; F16L 37/144; F16L 37/088; F16L 2201/10
See application file for complete search history.

(56) References Cited

U.S. PATENT DOCUMENTS

| 3,032,229 | A | * | 5/1962 | Schoepe | F16L 37/0885 220/4.01 |
| 3,508,580 | A | * | 4/1970 | Snyder, Jr. | F16L 37/50 137/614.04 |
| 3,976,100 | A | * | 8/1976 | Souslin | F16L 37/34 141/346 |
| 4,881,569 | A | * | 11/1989 | Fournier | F16L 37/40 251/149.6 |

(Continued)

FOREIGN PATENT DOCUMENTS

| CN | 2374733 Y | 4/2000 |
| CN | 205367172 U | 7/2016 |

(Continued)

OTHER PUBLICATIONS

PCT International Search Report for International Application No. PCT/US2019/061323, dated Feb. 4, 2020 (14 pages).

*Primary Examiner* — Zachary T Dragicevich
*Assistant Examiner* — Alexander T Rufrano
(74) *Attorney, Agent, or Firm* — HALEY GUILIANO LLP

(57) ABSTRACT

A fluid mating system includes a fitting connector, a mating connector and a planar slip system. The fitting connector includes an exterior mating surface and a first interior fluid passage that permits fluid flow along a first direction. The mating connector includes an interior surface that includes a tapered lead-in portion, an interior mating surface, and a second interior fluid passage. The second interior fluid (Continued)

passage permits fluid flow in the first direction. The first interior fluid passage and the second interior fluid passage include a single fluid path when the interior mating surface is engaged with the exterior mating surface. The planar slip system restricts movement of the mating connector in the first direction and allows at least partial free movement of the mating connector within a plane that is perpendicular to the first direction.

25 Claims, 20 Drawing Sheets

(56) References Cited

U.S. PATENT DOCUMENTS

| | | | | |
|---|---|---|---|---|
| 5,722,796 | A * | 3/1998 | Halvorsen | E21B 43/017 166/341 |
| 6,997,486 | B2 * | 2/2006 | Milhas | F16L 33/227 285/305 |
| 7,464,970 | B2 * | 12/2008 | Yamada | F16L 37/0982 285/305 |
| 7,478,839 | B2 * | 1/2009 | Barber | F16L 27/125 277/650 |
| 9,011,255 | B1 * | 4/2015 | Franzino | F16L 37/252 464/52 |
| 10,288,198 | B2 * | 5/2019 | Tiberghien | H05K 7/20272 |
| 11,353,152 | B1 * | 6/2022 | Hawk | B64G 1/402 |
| 2009/0045619 | A1 * | 2/2009 | Tajika | F02M 37/0017 285/91 |
| 2016/0010772 | A1 | 1/2016 | Tiberghien et al. | |
| 2016/0341348 | A1 * | 11/2016 | Lyon | F16L 37/38 |
| 2017/0341089 | A1 * | 11/2017 | Kraft | F16L 37/23 |

FOREIGN PATENT DOCUMENTS

| | | |
|---|---|---|
| EP | 2966396 | 1/2016 |
| GB | 831568 | 3/1960 |
| JP | S5340410 | 4/1978 |

* cited by examiner

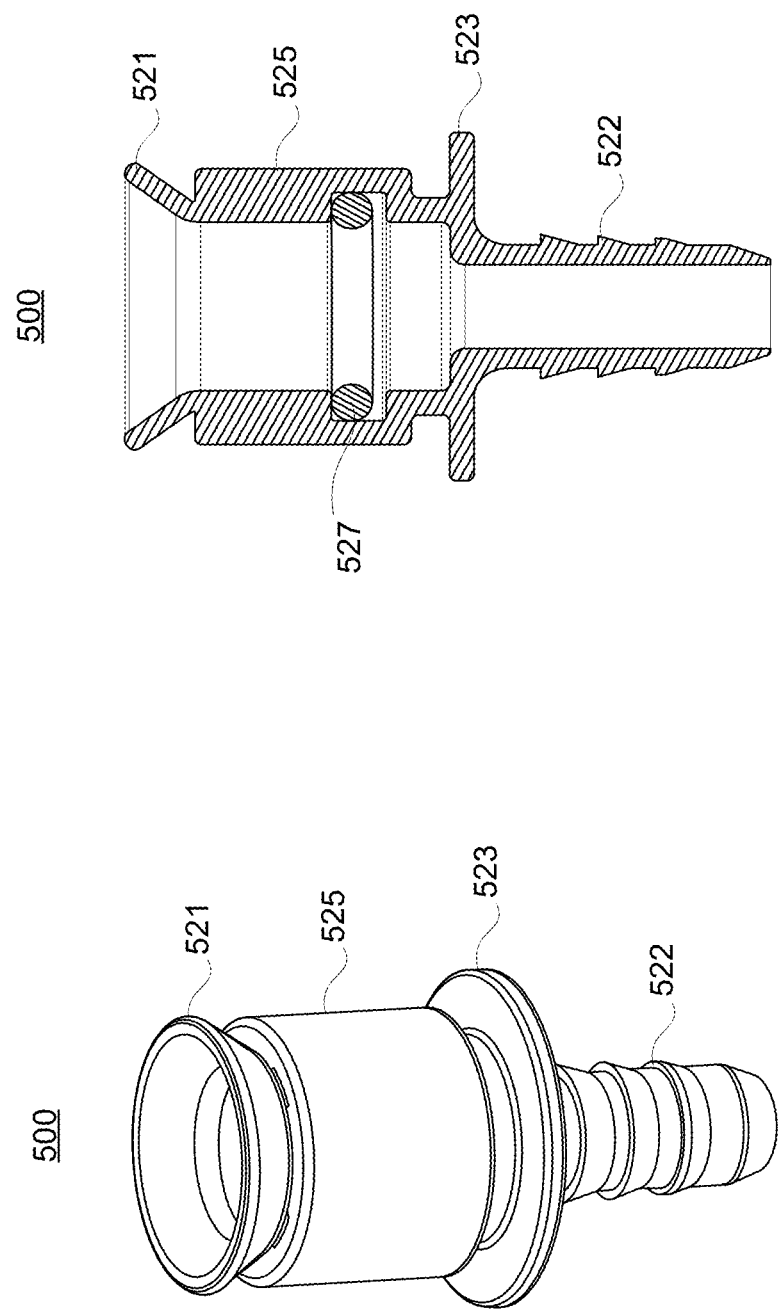

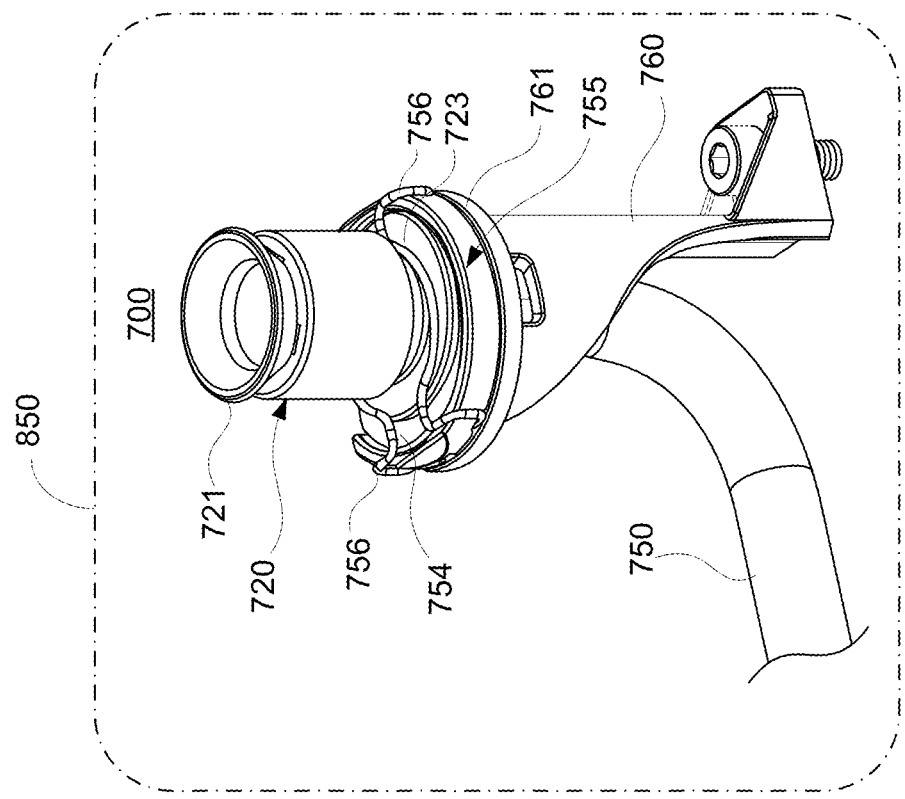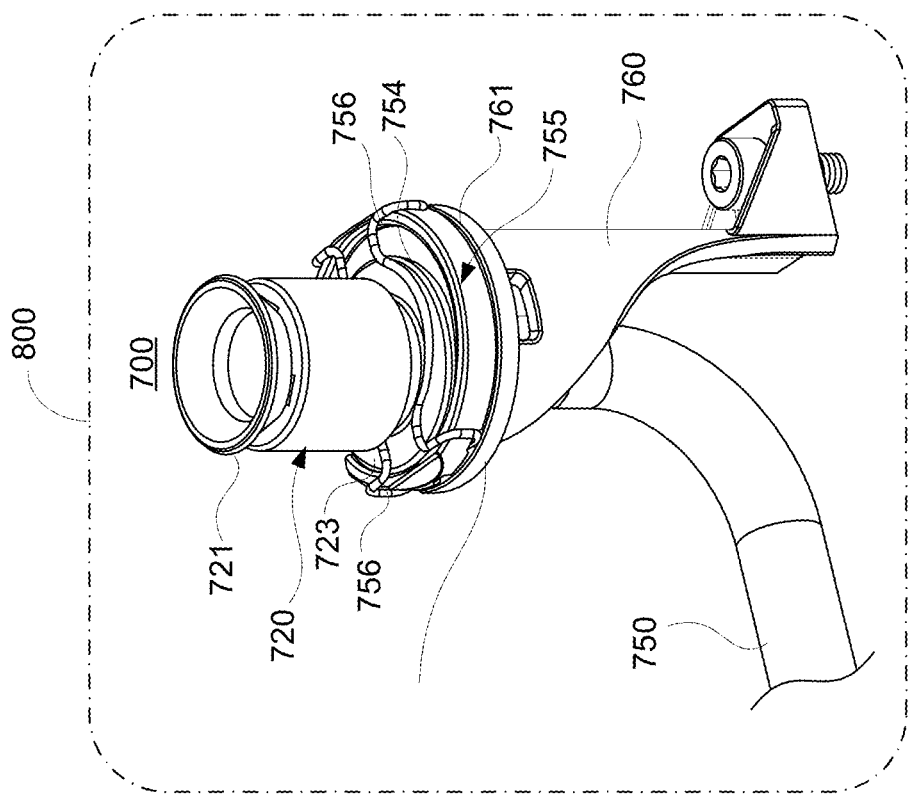
FIG. 8

BLIND MATE FLUID CONNECTOR

CROSS-REFERENCE TO RELATED APPLICATION

This application claims the benefit of U.S. Provisional Patent Application No. 62/760,490, filed Nov. 13, 2018, the disclosure of which is hereby incorporated by reference herein in its entirety.

The present disclosure is directed towards a mating fluid connector system, and more particularly, towards a blind mate connector system with aligning features.

SUMMARY

Fluid connections typically require alignment to ensure a reliable leak-proof seal. For example, if the connectors are misaligned, gaps may exist and the contained fluid may leak through the gap. Misalignment may be especially troublesome when the connectors are constrained against other components, or susceptible to a stack-up of tolerances.

In some embodiments, the present disclosure is directed to a fluid mating system with features for maintaining alignment when engaged. The fluid mating system includes a fitting connector and a mating connector. The fitting connector includes an exterior mating surface and a first interior fluid passage that permits fluid flow along a first direction. The mating connector includes an interior surface, a second interior fluid passage, and a planar slip system. The interior surface includes a lead-in portion and an interior mating surface. The lead-in portion is tapered toward the interior mating surface, and the interior mating surface defines a cavity to engage with the exterior mating surface. The second interior fluid passage permits fluid flow in the first direction. The first interior fluid passage and the second interior fluid passage include a single fluid path when the interior mating surface is engaged with the exterior mating surface. The planar slip system restricts movement of the mating connector in the first direction and allows at least partial free movement of the mating connector within a plane that is perpendicular to the first direction.

In some embodiments, the exterior mating surface defines a first cylindrical surface and the interior mating surface defines a second cylindrical surface. A diameter of the second cylindrical surface is greater than a diameter of the first cylindrical surface. In some embodiments, the lead-in surface defines a partial cone surface having a major diameter at an outer edge of the partial cone surface and a minor diameter at an inner edge of the partial cone surface. For example, a difference between the major diameter and the minor diameter may be greater than, or less than, a radius of the first cylindrical surface. In some embodiments, a difference between the major diameter and the minor diameter is less than a radius of the first cylindrical surface. In some embodiments, each of a center axis of the first cylindrical surface, a center axis of the second cylindrical surface, and a center axis of the partial cone surface, define an axis along the first direction. In some such embodiments, the inner edge of the partial cone surface corresponds to an initial opening of the interior mating surface, and the minor diameter is equal to the diameter of the second cylindrical surface.

In some embodiments, the engagement between the interior mating surface and the exterior mating surface comprises a slip fit. In some embodiments, the engagement between the interior mating surface and the exterior mating surface comprises a press fit. In some embodiments, the engagement between the interior mating surface and the exterior mating surface creates a seal for the single fluid path.

In some embodiments, the fluid mating system includes an O-ring located between the interior mating surface and the exterior mating surface to create the seal for the single fluid path.

In some embodiments, the mating connector includes an exterior contact surface, the planar slip system includes a platform having an interior contact surface and a seating surface, the seating surface restricts the movement of the mating connector in the first direction, and the interior contact surface allows the at least partial free movement of the mating connector within the plane that is perpendicular to the first direction based on the relative shapes of the interior contact surface and the exterior contact surface. For example, each of the interior contact surface and the exterior contact surface define a cylindrical surface. In a further example, a difference between the diameter of the interior contact surface and the exterior contact surface may be greater than, or less than, a radius of the first cylindrical surface. In some embodiments, the exterior contact surface defines an exterior surface of a rigid tube that extends below the seating surface and includes the second interior fluid passage. For example, the fluid mating system may include a flexible fluid tube coupled to the rigid tube.

In some embodiments, the mating connector includes a first lip that is seated on the seating surface, the exterior contact surface is an exterior surface of the first lip, the platform comprises a second lip, and the interior contact surface is an exterior surface of the second lip.

In some embodiments, the fluid mating system includes a retaining component that retains the mating connector on the seating surface of the platform. For example, the retaining component includes a retaining clip that applies a force to the mating connector along the first direction towards the seating surface of the platform. In a further example, the retaining clip is detachably affixed to the platform and is seated over at least a portion of the mating connector.

In some embodiments, the fluid mating system includes a fixed mounting bracket, and the platform is fixedly attached to the fixed mounting bracket along the plane. For example, in some embodiments, the fixed attachment includes a snap fit between one or more snaps of the platform and one or more through holes of the fixed mounting bracket.

In some embodiments, the at least partial free movement of the mating connector within a plane includes linear movement in at least one direction. In some embodiments, the at least partial free movement of the mating connector within a plane includes lateral (e.g., azimuthal, radial, or both) movement in any direction.

In some embodiments, the present disclosure is directed to a mating connector. The connector includes an interior surface, a planar slip system, and an interior fluid passage. The interior surface includes a lead-in portion and an interior mating surface. The lead-in portion is tapered toward the interior mating surface and the interior mating surface defines a cavity. The planar slip system restricts movement of the connector in a first direction and allows at least partial free movement of the mating connector within a plane that is perpendicular to the first direction. The interior fluid passage permits fluid flow in the first direction.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 5A shows a perspective view of an illustrative connector having a lead-in feature, in accordance with some embodiments of the present disclosure;

FIG. 5B shows a cross-sectional side view of the illustrative connector of FIG. 5A having a lead-in feature, in accordance with some embodiments of the present disclosure;

FIG. 8 shows perspective views of the illustrative connector system of FIG. 7, with the mating connector in two different lateral positions, in accordance with some embodiments of the present disclosure;

DETAILED DESCRIPTION

The present disclosure relates to a connector for creating a connection for a fluid passage between two components. More particularly, the present disclosure relates to a connector for creating a connection for a fluid passage between two components in difficult to reach locations, such as where it is difficult or impossible for a technician or robot to access a location within a vehicle. In exemplary embodiments the location may be a within a battery system of a vehicle, such as where a battery module attaches into a battery pack frame structure. A fluid such as a coolant may be provided to and/or from the battery modules to maintain a desired temperature of the batteries, or to perform other functions such as lubrication or drainage. A connector may be integral to the battery module, attached thereto, and extend therefrom, and may need to be connected to another connector at a location that is difficult to access with hands or tools, for example, a mating connector that is standing in an upright position relative to a bottom plate of the battery pack frame.

Unlike most applications where there may be hand or tool access to a fluid connector and a technician or robot may align multiple connectors based on a visual or other inspection and engage the connectors to each other, in some applications the connection point may be blind or nearly blind and any physical access to locks or latching mechanisms may be extremely difficult. If the connectors are not aligned they will not engage with each other at all, the fluid passage may not be made through the connection, and/or desired seals may be broken such that materials such as a coolant are not isolated from the external environment. If a locking or latching mechanism requires hand or tool access in order to disengage the latching or locking mechanism, it may be more likely that the locking or latching is performed incorrectly such that engagement or a seal is not maintained over time, fluid leaks or mixes with other materials, or other undesirable consequences occur.

Moreover, due to manufacturing part tolerances and assembly tolerances it may not practical to make a blind fluid connection between two connectors, particularly where one or more of the components are rigidly fixed to other respective components (e.g., a fitting connector rigidly fixed to a battery module and a mating connector rigidly fixed to a battery pack frame structure). Due to stack-up of manufacturing and assembly tolerances, the relative locations of the mating connectors may be such that the connection is not made, causes undue stress during assemble, or creates an ongoing strain during operation, thus reducing the quality and manufacturability of the battery pack system.

Figure 1:
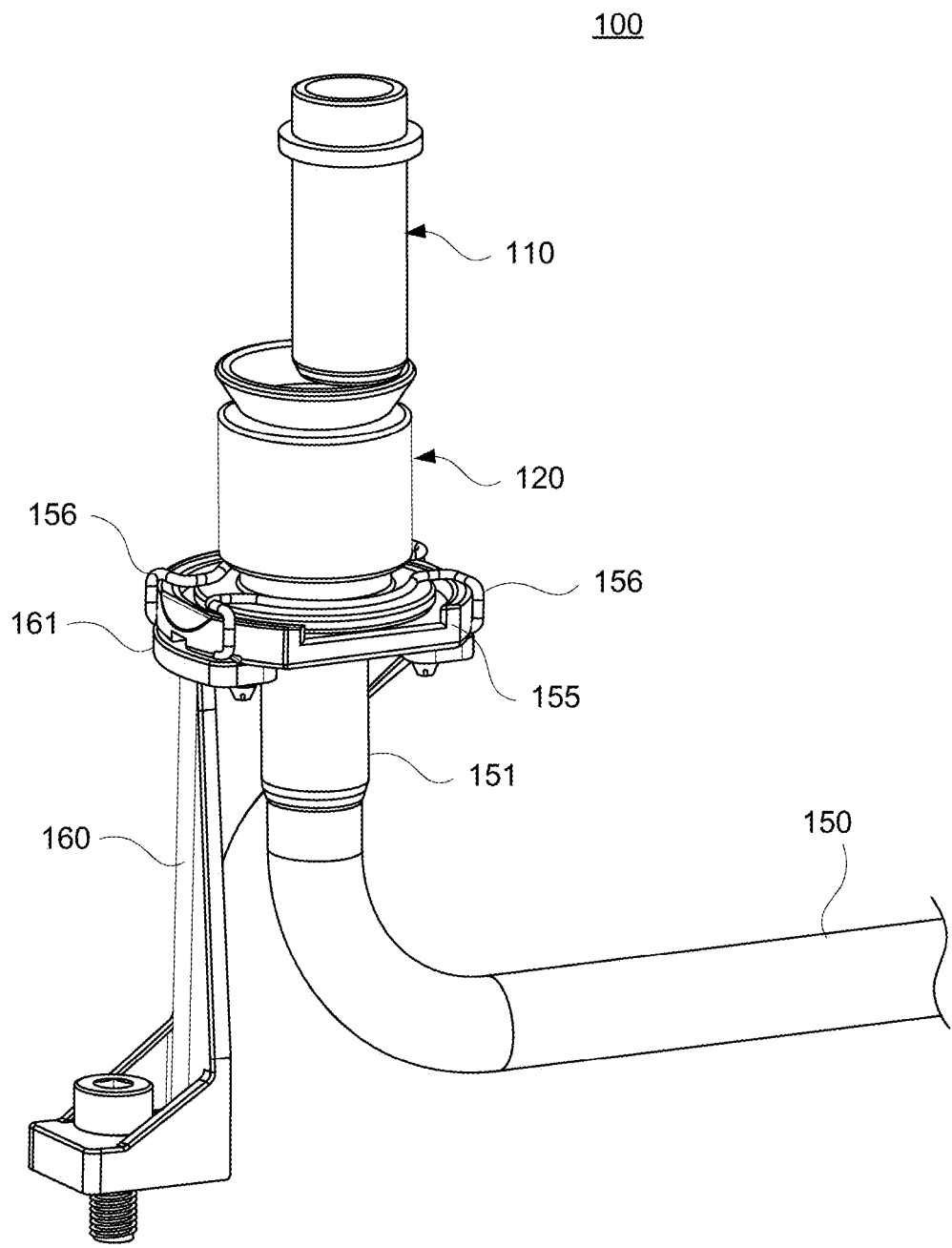
FIG. 1 shows a perspective view of an illustrative connector system, in accordance with some embodiments of the present disclosure.
Figure 2:
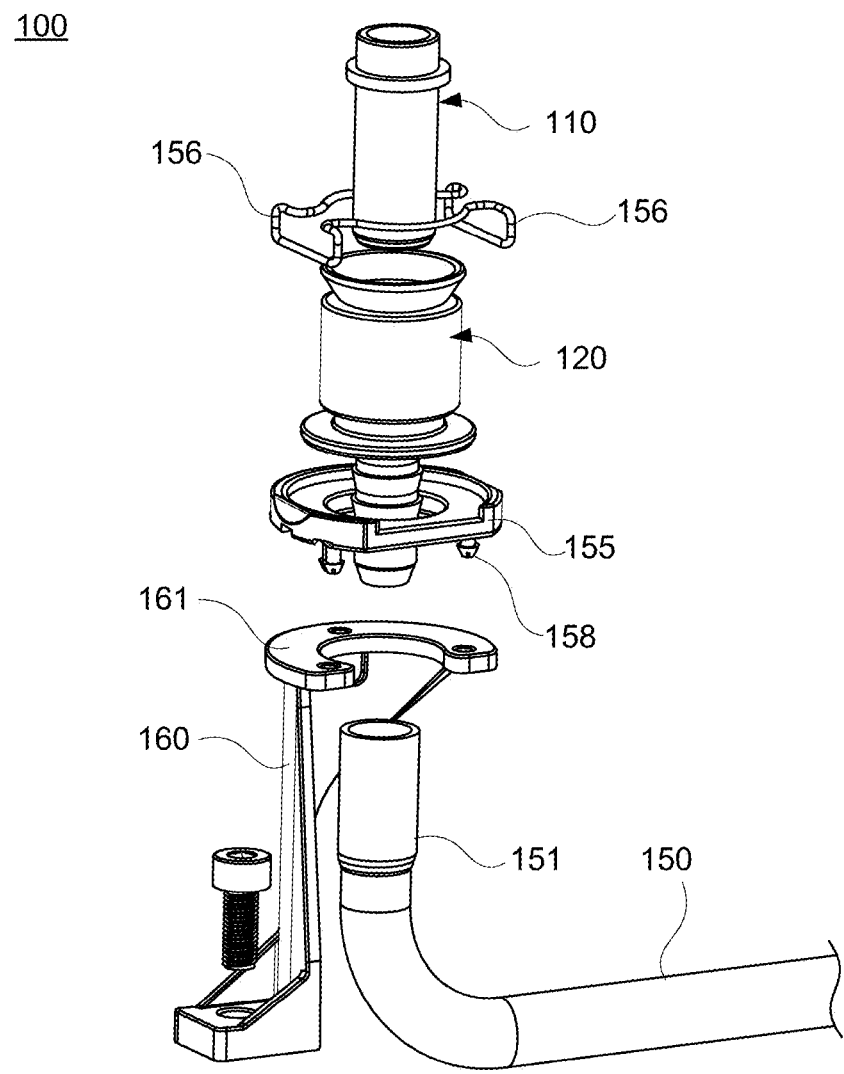
FIG. 2 shows an exploded perspective view of the illustrative connector system of FIG. 1, in accordance with some embodiments of the present disclosure.
Figure 3:
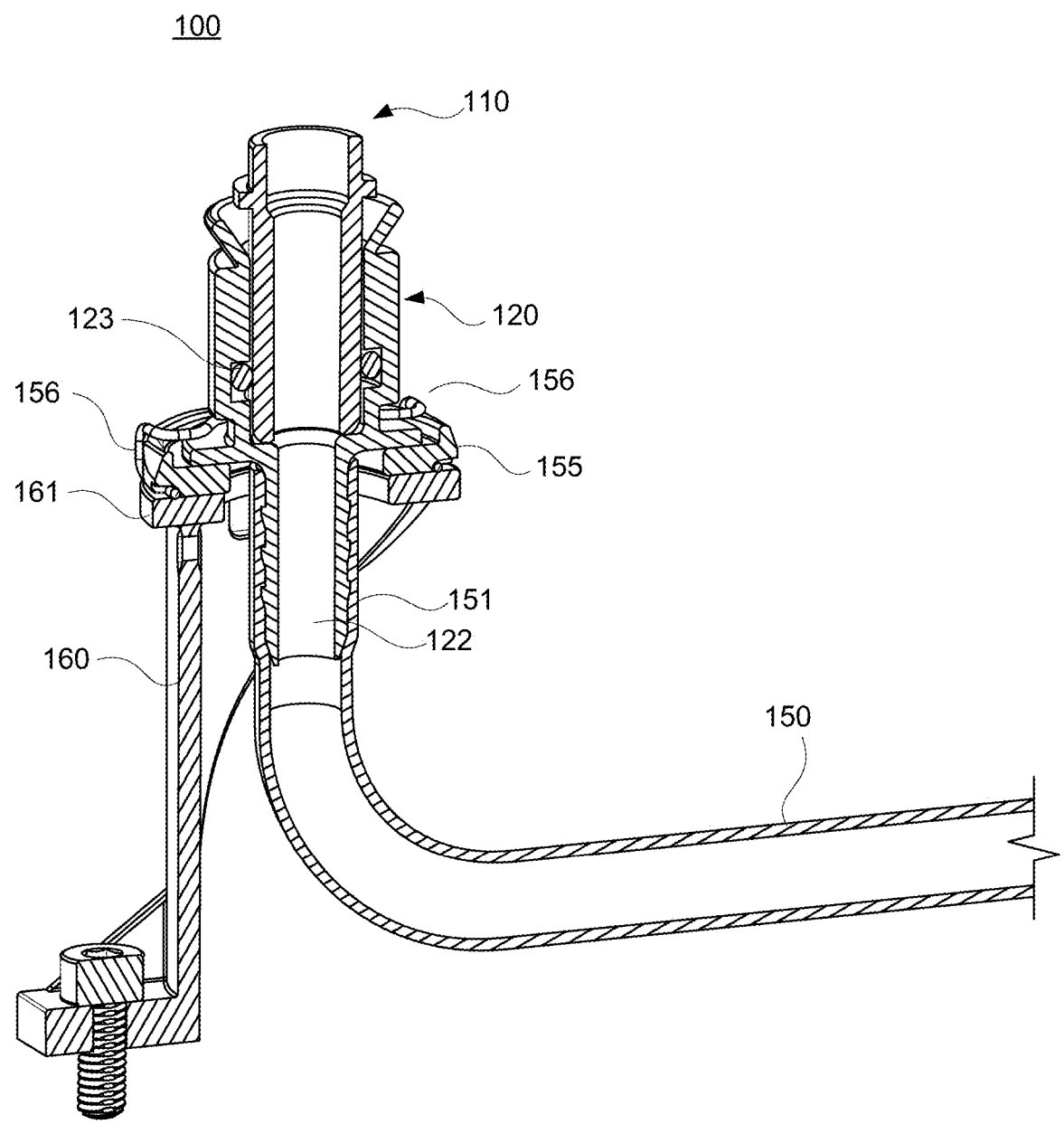
FIG. 3 shows a perspective cross-sectional view of the illustrative connector system of FIG. 1, in accordance with some embodiments of the present disclosure.

FIG. 1 shows a perspective view of illustrative connector system 100, in accordance with some embodiments of the present disclosure. FIG. 2 shows an exploded perspective view of illustrative connector system 100 of FIG. 1, in accordance with some embodiments of the present disclosure. FIG. 3 shows a perspective cross-sectional view of illustrative connector system 100 of FIG. 1, in accordance with some embodiments of the present disclosure. Mating connector 120 and fitting connector 110 may be self-aligning, such that they are able to connect/engage and seal with each other automatically without hands, fingers or tools in applications where there is limited or no access. In some embodiments, connector system 100 is a "blind mate" fluid connector system allowing a sealed fluid connection to be made without visual confirmation or hand or tool access to mating connector 120 or fitting connector 110. Although additional components may be provided in certain embodiments or one or more components may be removed or combined in some embodiments, in the embodiment depicted herein the blind mate fluid connector may include fitting connector 110 (e.g., a fluid fitting pin), mating connector 120 (e.g., a fluid connector), connector platform 155 (e.g., with fastening features 158), retaining component (e.g., retaining clips 156), a seal (e.g., O-ring seal 123), mount 160 (e.g., including mounting bracket 161, and fluid tube 150 (e.g., a flexible fluid tube with end 151). In some embodiments, fitting connector 110 may be attached to a battery module (e.g., a cooling system thereof), for example, to provide a fluid path for coolant to and/or from the battery module (e.g., to a cooling manifold located between battery packs of a battery module). The attachment to the battery module may be fixed such that fitting connector 110 is not intended to move relative to the battery module.

In some embodiments, mating connector 120 includes one or more features for sealing and securing fluid tube 150, or end 151 thereof. For example, as illustrated, mating connector 120 includes barbed section 122 which engages against end 151 to create fluid-tight seal and a robust mechanical affixment. Mating connector 120 and fluid tube 150 may seal, secure, or both using any suitable features or components such as, for example, flare fittings, barbed fittings, compression fittings, flanged fittings, O-ring fittings, tapered threaded fittings, face-sealed fittings, radial-seal fittings, any other suitable interface, or any combination thereof. Fluid tube 150 may include any suitable fluid conduit such as, for example, tubing (e.g., flexible or in flexible, plastic, rubber, or metal tubing), hosing, pipe, any other suitable fluid conduit, or any combination thereof.

Figure 4:
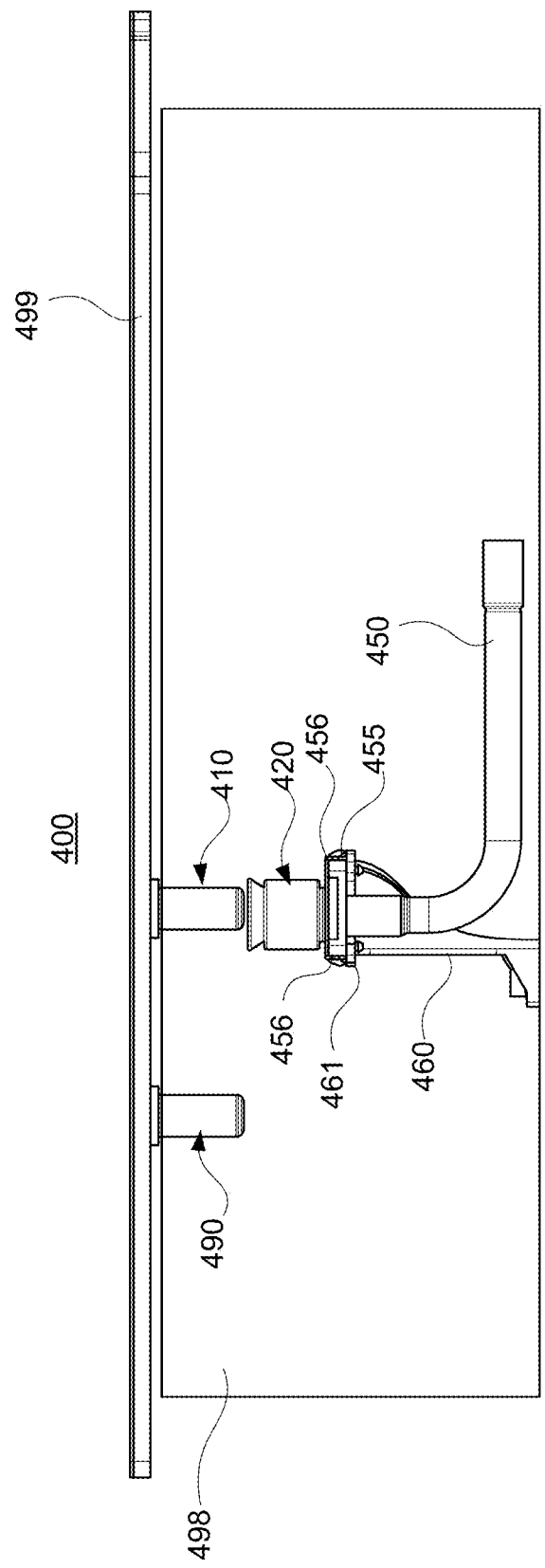
FIG. 4 shows a side view of an illustrative connector system before engagement, in accordance with some embodiments of the present disclosure.

FIG. 4 shows a side view of an illustrative connector system 400 before engagement, in accordance with some embodiments of the present disclosure. Connector system 400 includes component 499 (e.g., a battery module having a cooling plate) having two fitting connectors 410 and 490. As shown, fitting connector 410 and mating connector 420 are not yet engaged. Connector fitting 490 is also configured to engage a corresponding mating connector (not shown).

In some embodiments, mating connector 420, sealing component (not visible in FIG. 4), retaining component (e.g., retaining clips 456), connector platform 455, flexible fluid tube 450, and mount 460 with mounting bracket 461 may be assembled and attached to receiving system 498 (e.g., a battery pack frame or portions thereof) prior to insertion of component 499 (e.g., battery module or portions thereof) including the fitting connector 410 (e.g., fluid fitting pin). For example, a mounting bracket may be fixedly attached to a component of the battery frame such as a cross member, sidewall, or bottom plate, such that an upper face of the mounting bracket is on a plane parallel to the bottom plate of the battery pack frame facing upward. Connector platform 455 may be connected to mounting bracket 461 in any suitable manner (e.g., bolts, screws, snaps, etc.) to be fixedly attached thereto. Mating connector 420 may be seated on an upper seating surface of connector platform 455 and may be attached to connector platform 455 in a manner that applies downward pressure but permits movement of mating connector 420 when a force occurs within the plane of the seating surface (e.g., an x-y-plane). Fluid tube 450 (e.g., a flexible fluid tube) may attach to mating connector 420 in a suitable manner such as clamps (retainer clip 456), springs, barbs, any other suitable retainer, or any combination thereof. Because these components are assembled and attached to receiving system 498 (e.g., a battery pack frame) prior to insertion of component 499 (e.g., a battery module), the components are accessible to hand or tool access and the manufacturing processes are not blind.

In an illustrative example, it may be desirable for battery modules to be inserted in a high-density configuration within the battery frame to maximize the battery power that is available from a given amount of battery frame space. Thus, when the battery module is inserted downward into the frame (e.g., between one or more cross members and/or side members) the connection of a downward facing fluid fitting pin to the upward facing fluid connector (e.g., mating connector 420) may be blind. Accordingly, it may not be possible or feasible to adjust the relative positions of the fluid fitting pin or fluid connector (e.g., fitting connector 410) to adjust their relative location. However, each of these components defines a portion of a fluid passage that must be sealed, for example, to maintain the integrity of a fluid such as coolant for the battery system. Moreover, because the battery system is part of a vehicle that undergoes substantial stress during driving, forcing the components to connect will create permanent stresses on one or both of the fluid fitting pin or fluid connector (e.g., fitting connector 410) resulting in an increased likelihood of failure.

FIG. 5A shows a perspective view of illustrative connector 500 having lead-in feature 521, in accordance with some embodiments of the present disclosure. FIG. 5B shows a cross-sectional side view of illustrative connector 500 of FIG. 5A having lead-in feature 521, in accordance with some embodiments of the present disclosure. The "blind mate" fluid connector system allows a sealed fluid connection to be made without visual confirmation or hand or tool access to the connector or fitting. Connector 500 (e.g., which may be similar to mating connector 120 of FIGS. 1-3) may have internal O-ring 527 to seal against the fitting pin (e.g., a fitting connector, not shown) which in an exemplary embodiment may be a traditional fixed connector. Connector 500, as illustrated, includes inverse cone lead-in feature 521 that is a self-alignment feature that guides a fitting pin (e.g., a fitting connector, not shown) as it is pushed in a first downward direction to align its axis with the axis of the connector.

A mating connector such as connector 500 may include an interior mating surface having a shape to permit sealed engagement with exterior mating surface of the fitting connector. A tapered upper portion (e.g., the radially inner surface of lead-in feature 521) of connector 500 leads into an upper portion of the interior mating surface (e.g., within connector body 525). If the fitting connector (not shown) and mating connector (e.g., connector 500) are aligned, the fitting connector does not contact the tapered portion (e.g., inner surface of lead-in portion 521). If the fitting connector and mating connector are not aligned, the fitting connector contacts the tapered portion and exerts a normal force relative to the downward force of the fitting pin along the axis of insertion/fluid flow. This force is exerted on the mating connector (e.g., connector 500) perpendicular to the direction of insertion (e.g., the radial direction, perpendicular to the axial direction) and causes the mating connector to move on the slip system as described herein, such that the fitting connector and mating connector are aligned (e.g., laterally aligned). When the connectors are aligned, the interior mating surface of the mating connector engages with the exterior mating surface of the fitting connector (e.g., with a suitable fit such as a slip fit, press fit, etc.) to create a seal and permit fluid flow through the fluid passage. In some embodiments, the extent of downward movement of the fitting connector into the mating connector is limited by components not depicted herein, such as by the insertion of the battery module into the battery frame system (e.g., as partially illustrated in FIG. 4). The seal may by formed by suitable sealing systems, such as an O-ring that is located within the interior mating surface (e.g., the fitting connector may seal against O-ring 527).

The lower portion of the mating connector may include lip 523 and extension 522. Lip 523 may be a shape such as a disc shape although any other suitable shape (e.g., oval, rectangular, square, irregular shapes, etc.) may be utilized based on a degree and direction of slipping motion that is desired within the plane of slippage. The bottom surface of lip 523 may be a planar surface to sit upon (and slip upon) an upper planar surface of the connector platform (e.g., as illustrated in FIGS. 6A-7B). Lip 523 may have a sufficient height to engage with a lip of the connector platform to prevent "jumping" or misalignment when lip 523 contacts the connector platform lip. Extension 522, as illustrated, extends down from lip 523 through a through hole of the connector platform to engage with a fluid tube. Extension 522 may be a shape such as a cylindrical shape although other suitable shapes (e.g., oval, rectangular, square, irregular shapes, etc.) may be utilized based on a degree and direction of slipping motion that is desired within the plane of slippage. When the bottom surface of lip 523 slips on the upper planar surface of the connector platform, extension 522 may move within the through hole within the plane perpendicular to the insertion direction until an exterior surface thereof contacts the inner diameter of the through hole of the connector platform. Thus, either or both of lip 523 or extension 522 may limit the movement of the mating connector on the slip system of the connector platform. Depending on the selection of the relative sizes, shapes, and orientations of lip 523, extension 522, connector lip, and connector through hole, a variety of slipping motion profiles may be implemented. It will be understood that although extension 522 is illustrated as a barb in FIGS. 5A-5B, extension 522 may include any suitable features and components to seal against a fluid tube such as, for example, flare fittings, barbed fittings, compression fittings flanged fittings, O-ring fittings, tapered threaded fittings, face-sealed fittings, radial-seal fittings, any other suitable interface, or any combination thereof.

Figure 6B:
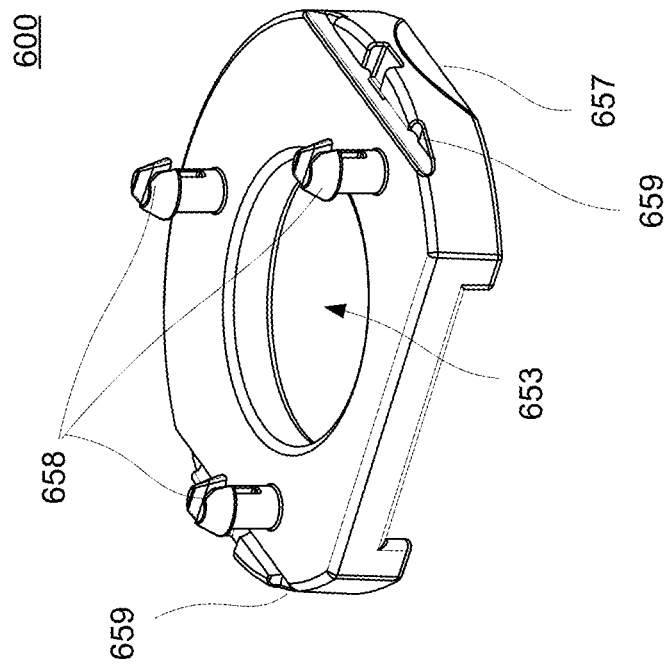
FIG. 6B shows a perspective view of the illustrative connector platform of FIG. 6A from below, in accordance with some embodiments of the present disclosure.
Figure 6A:
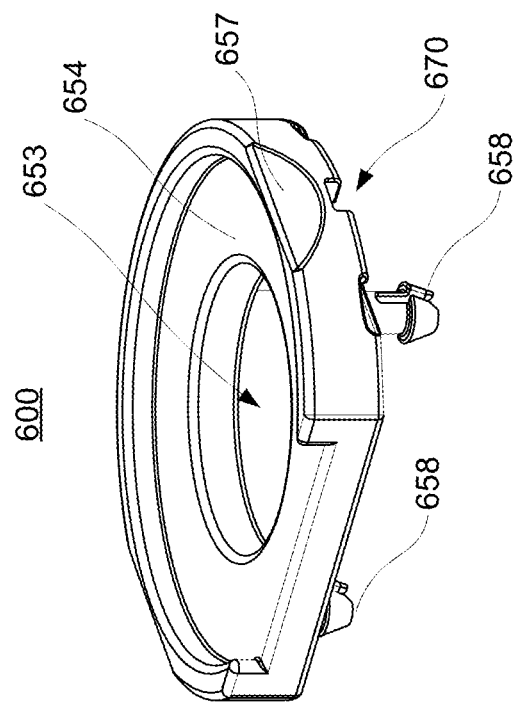
FIG. 6A shows a perspective view of an illustrative connector platform from above, in accordance with some embodiments of the present disclosure.

FIG. 6A shows a perspective view of illustrative connector platform 600 from above, in accordance with some embodiments of the present disclosure. FIG. 6B shows a perspective view of illustrative connector platform 600 of FIG. 6A from below, in accordance with some embodiments of the present disclosure. As illustrated, connector platform 600 includes slip surface 654, hole 653, lead-in ramps 657, retainer groove 659, retainer removal slot 670, and fastening features 658. Hole 653 is configured to accommodate a mating connector or portion thereof (e.g., extension 522 of connector 500 of FIGS. 5A-5B). Slip surface 654 is configured to allow lateral slip of a mating connector or portion thereof (e.g., lip 523 of connector 500 of FIGS. 5A-5B). Lead-in ramps 657 are configured to direct a retainer into retainer groove 659 to secure a mating connector (e.g., retainer clips 156 of FIGS. 1-3). Retainer removal slot 670 is configured to allow a retainer to be removed (e.g., by prying against a retainer arranged in retainer groove 659). Fastening features 658 are configured to engage with corresponding features to secure connector platform 600 against a mount. For example, fastening features 658 may engage with corresponding holes of a mounting bracket (e.g., mounting bracket 161 of mount 160 of FIG. 1).

In an illustrative example, connector 500 of FIGS. 5A-5B may be coupled to connector platform 600 of FIGS. 6A-6B to function as a slip system. In some embodiments, the slip system may be a "slip disc" feature where a disc-shaped lip (e.g., lip 523) of the connector is trapped between the connector platform (e.g., connector platform 600) and a retaining ring so that it cannot move along the axis of the fluid path (e.g., the axis of insertion of the fluid fitting pin). The slip disc (e.g., lip 523) may allow radial displacement of the mating connector against the slip surface (e.g., slip surface 654) until it contacts the platform border wall or a connector stem (e.g., extension 522 therefrom that connects to a flexible fluid tube) contacts the inner through hole (e.g., hole 653) of the connector platform (e.g., connector platform 600).

Figure 7:
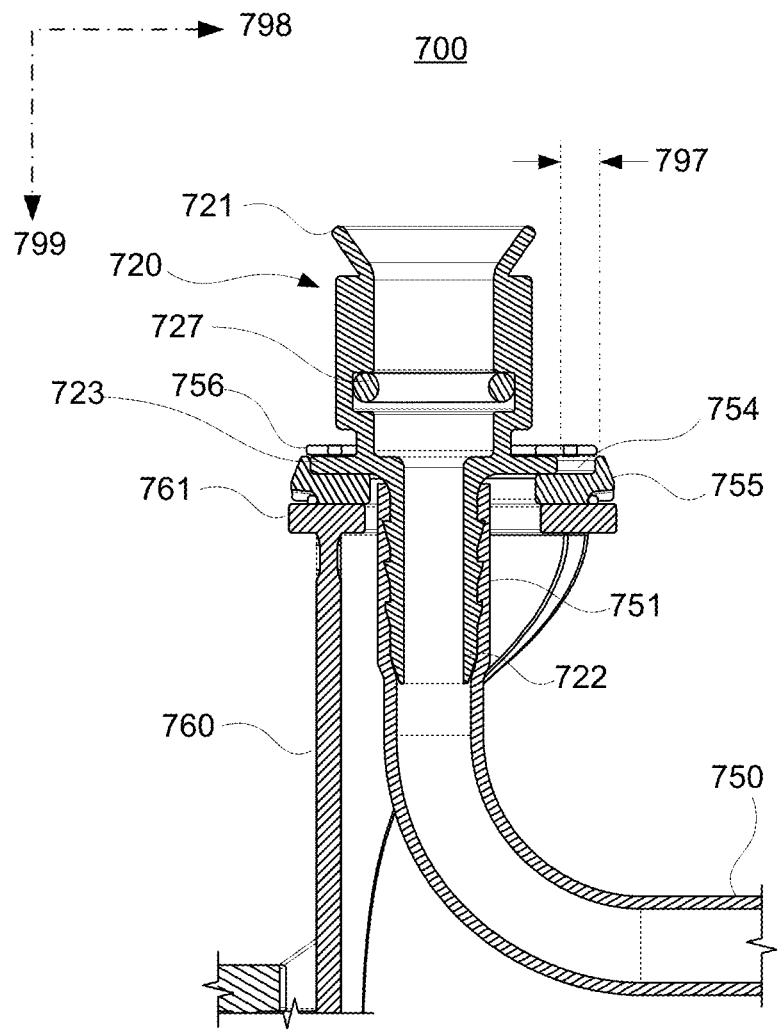
FIG. 7 shows a cross-sectional side view of an illustrative connector system allowing lateral displacement, in accordance with some embodiments of the present disclosure.

FIG. 7 shows a cross-sectional side view of illustrative connector system 700 allowing lateral displacement, in accordance with some embodiments of the present disclosure. A slip system (e.g., a planar slip system as illustrated) is formed between lip 723 of connector 720 and slip surface 754 of connector platform 755. The slip system allows connector 720 to be supported and restrained along the direction of the connector's axis (e.g., axis 799) but allows sliding movement on slip surface 754 of connector platform 755 (e.g., a plane perpendicular to axis 799 and including radial direction 798), and insertion of a fitting pin (e.g., of a fitting connector) so that connector 720 can align with the fitting pin as it is inserted even if their axis are not perfectly aligned (e.g., axis 799 is not coincident with a center axis of the fitting pin). In some embodiments, connector platform 755 may be integral to mounting bracket 761 of mount 760. In some embodiments, connector platform 755 may be a separate part from mounting bracket 761 so that different styles of brackets could be used in different locations or applications without having to change (e.g., swap) connector platform 755. Connector platform 755 and retaining clip 756 may be preassembled together or may be separate components as depicted in the drawings for this application. Separate components may allow for a fluid distribution manifold with many different branches to have these fluid connectors (e.g., mating connectors such as connector 720)

preassembled and attached (e.g., snapped into with a retaining clip such as retaining clip 756) to connector platforms that are permanently assembled to the frame or other blind access components. In some embodiments, a "dry-break" or "flow-stop" valve could be incorporated into the fluid connector and/or the fitting pin to prevent leakage/spills of fluid when disconnecting.

The force required to cause slipping movement of connector 720 (e.g., lip 723 thereof) on connector platform 755 (e.g., slip surface 754 thereof) may be based on the surface characteristics of the respective components as well as the force applied by the retaining component (e.g., retaining clip 756) perpendicular to the planar surfaces of the mating connector (e.g., connector 720) and connector platform (e.g., connector platform 755). For example, retaining clip 756 prevents significant displacement of connector 720 along axis 799. By varying the materials and applied force the slippage characteristics of the slip system may also be modified. Fluid tube 750, which is coupled via end 751 to extension 722 of connector 720, may move along with connector 720 in the lateral direction. As illustrated, connector 720 may slip diametral distance 797 along the slip system, thus allowing for a misalignment of distance 797.

FIG. 8 shows perspective views of illustrative connector system 700 of FIG. 7, with connector 720 in two different lateral positions, in accordance with some embodiments of the present disclosure. Panel 800 shows connector system 700 with connector 720 at a first lateral position, while panel 850 shows connector system 700 at a second lateral position, diametrically opposite the first position. Panels 800 and 850 illustrate the extent of lateral displacement allowed by the planar slip system (e.g., lip 723 and slip surface 754).

Figure 9:
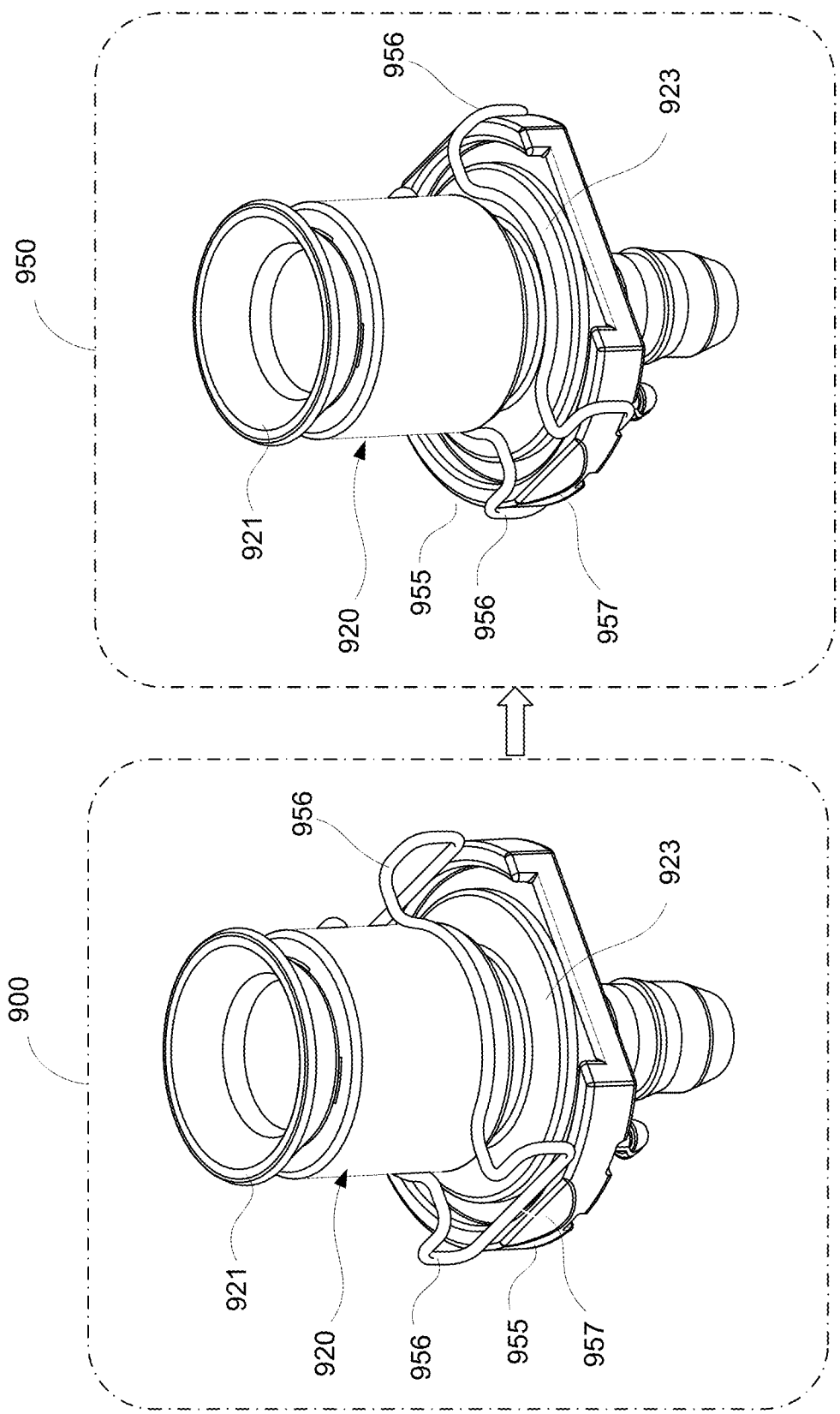
FIG. 9 shows perspective views of an illustrative connector being installed against a connector platform, in accordance with some embodiments of the present disclosure.

FIG. 9 shows perspective views of illustrative connector 920 being installed against connector platform 955, in accordance with some embodiments of the present disclosure. Panel 900 shows connector 920, which includes lead-in feature 921, in place against connector platform 955, and retaining clips 956 partially installed (e.g., installed by lowering from above, as illustrated). Panel 950 shows connector 920 in place against connector platform 955 with retaining clips 956 fully installed (e.g., installed by lowering from above over lead-in ramps 957, as illustrated). Retaining clips 956 are merely illustrative, and any suitable retention mechanism that suitably constrains motion of connector 920 relative to connector platform 955 may be used in accordance with the present disclosure.

It will be understood that the connector system of the present disclosure can be implemented in different forms. FIGS. 10-17 illustrate another implementation of a connector system having aligning features that can be used for making blind or nearly blind connections, in accordance with some embodiments of the present disclosure.

Figure 10:
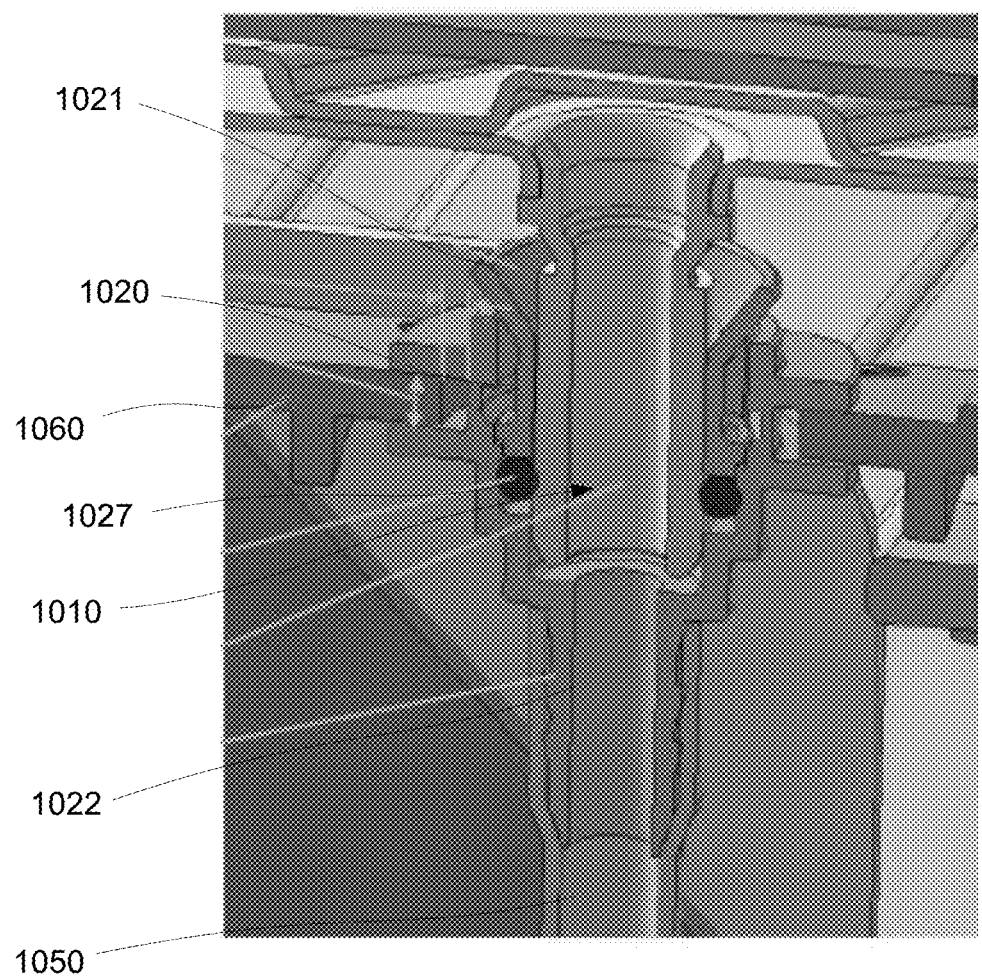
FIG. 10 shows a perspective cross-sectional view of an illustrative fitting connector engaged with a mating connector, in accordance with some embodiments of the present disclosure.

FIG. 10 shows a perspective cross-sectional view of illustrative fitting connector 1010 engaged with mating connector 1020, in accordance with some embodiments of the present disclosure. Configuration 1000 is an illustration of engaged connectors, thus forming a fluid coupling. Mating fitting 1020 includes lead-in feature 1021, seal 1027 (e.g., an O-ring as illustrated), and extension 1022 configured to engage with tube 1050. Mating fitting 1020 and bracket 1060 form a planar slip system, which allows fitting connector 1010 and mating connector 1020 to be laterally misaligned up to a predetermined degree at installation while still ensuring a seal. For example, fitting connector 1010 may be capable of 3 mm of lateral displacement, or any other suitable displacement depending on the geometry of the planar slip system.

Figure 11:
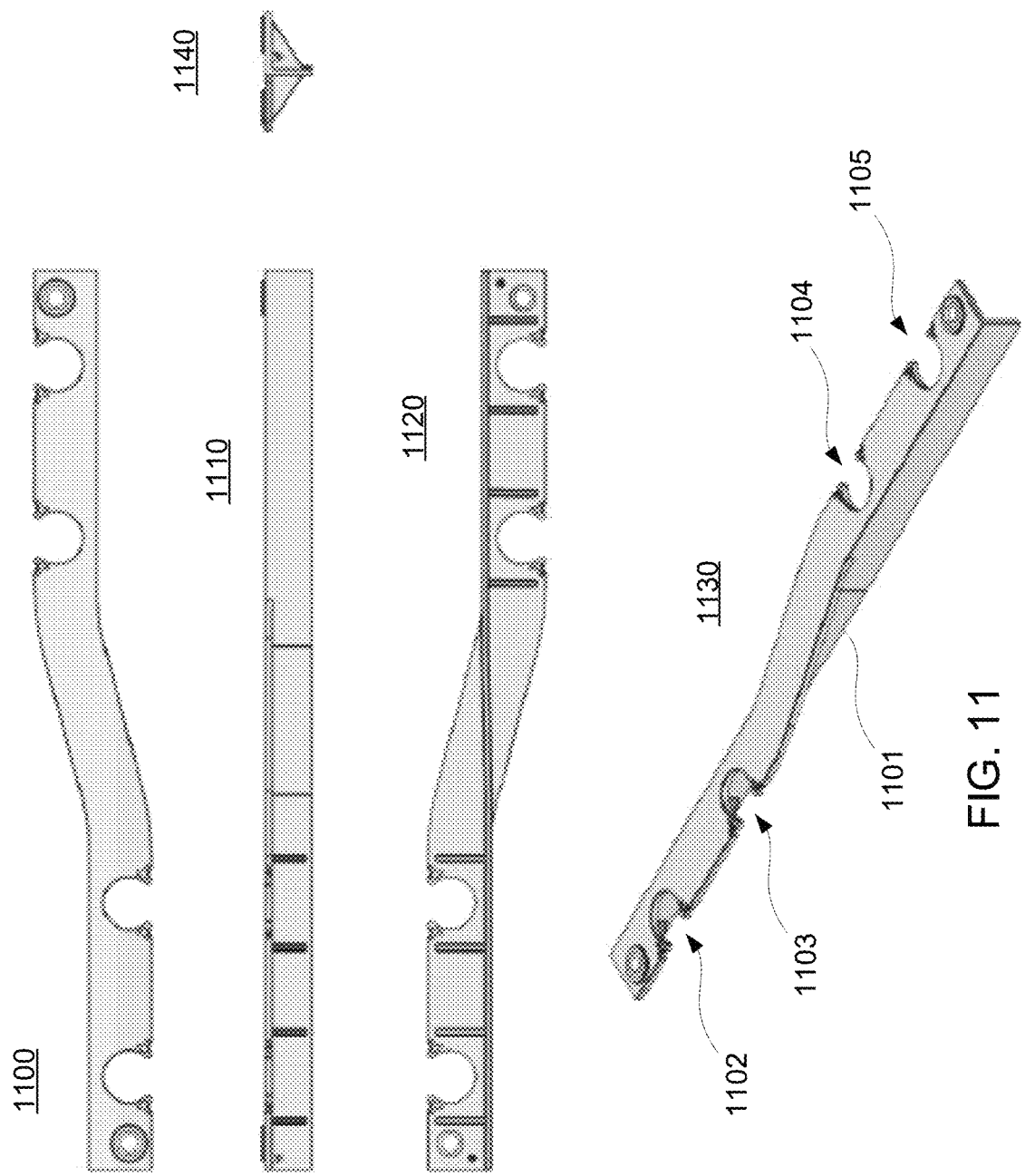
FIG. 11 shows several views of an illustrative bracket for securing one or more mating connectors, in accordance with some embodiments of the present disclosure.

FIG. 11 shows several views of illustrative bracket 1101 for securing one or more mating connectors, in accordance with some embodiments of the present disclosure. Panel 1100 shows a top view of bracket 1101, panel 1110 shows a side view of bracket 1101, panel 1120 shows a bottom view of bracket 1101, panel 1130 shows a perspective view of bracket 1101, and panel 1140 shows an end view of bracket 1101. Bracket 1101 is configured to secure a plurality of mating connectors (e.g., four connectors as illustrated), forming a respective planar slip system with each mating connector. Bracket 1101 includes reliefs 1102, 1103, 1104, and 1105 configured to accommodate respective mating connectors and form respective planar slip systems.

FIGS. 12-17 shows various views and configurations of a bracket, mating connectors, and fitting connectors, in accordance with some embodiments of the present disclosure.

Figure 12:
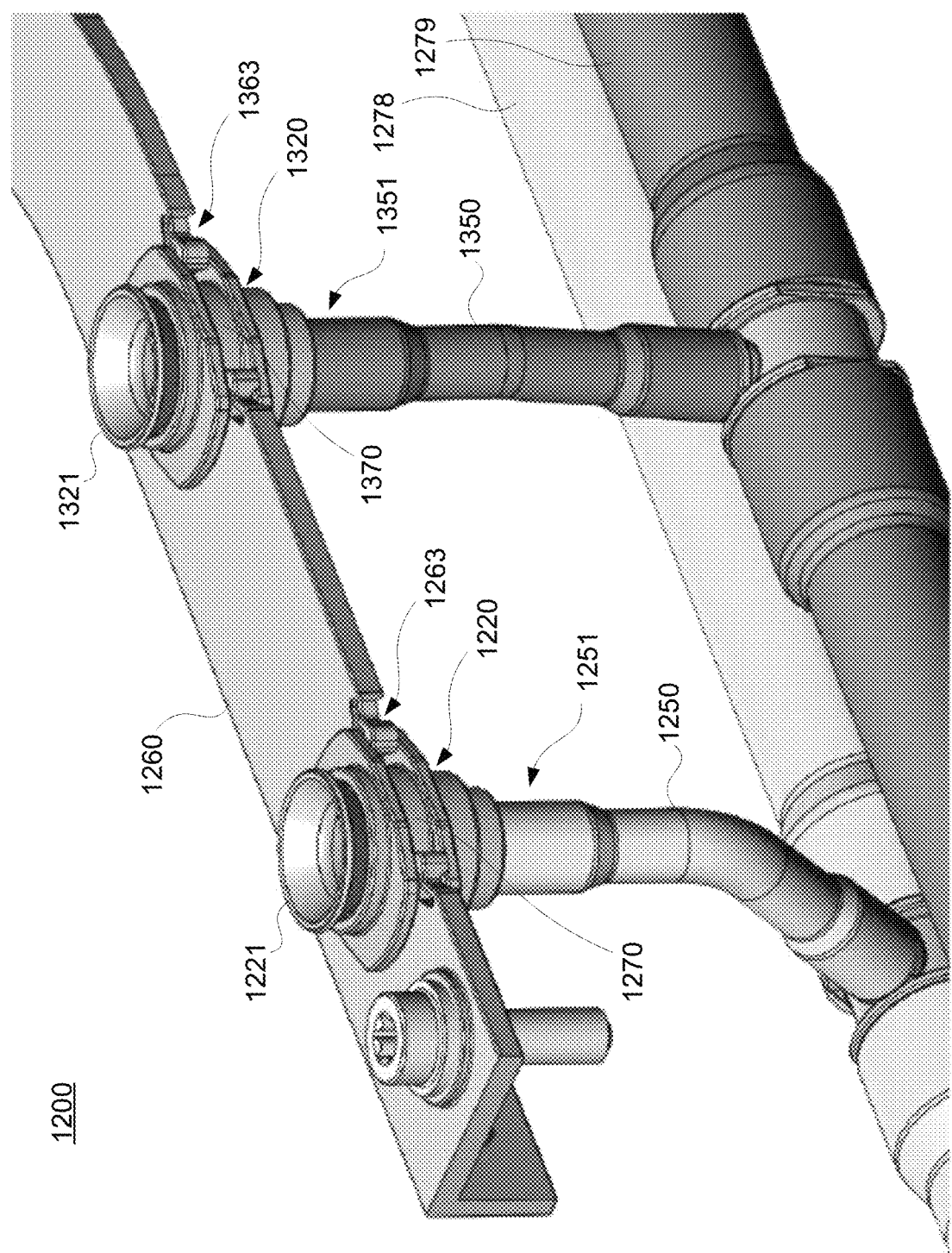
FIG. 12 shows a perspective view of an illustrative bracket with two mating connectors installed, and two fluid conduits, in accordance with some embodiments of the present disclosure.
Figure 13:
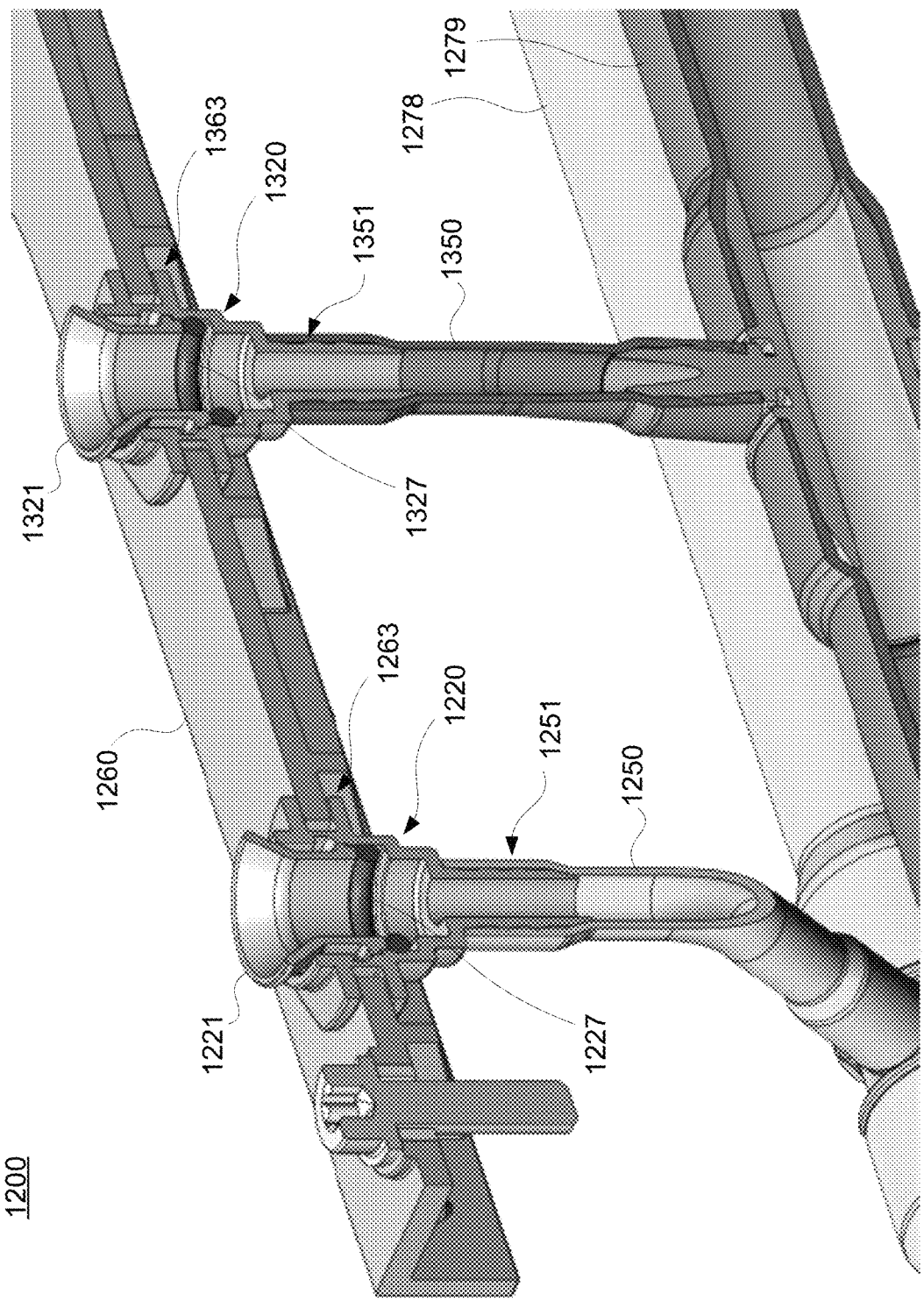
FIG. 13 shows a perspective cross-sectional view of the illustrative bracket with two mating connectors installed, and two fluid conduits of FIG. 12, in accordance with some embodiments of the present disclosure.
Figure 14:
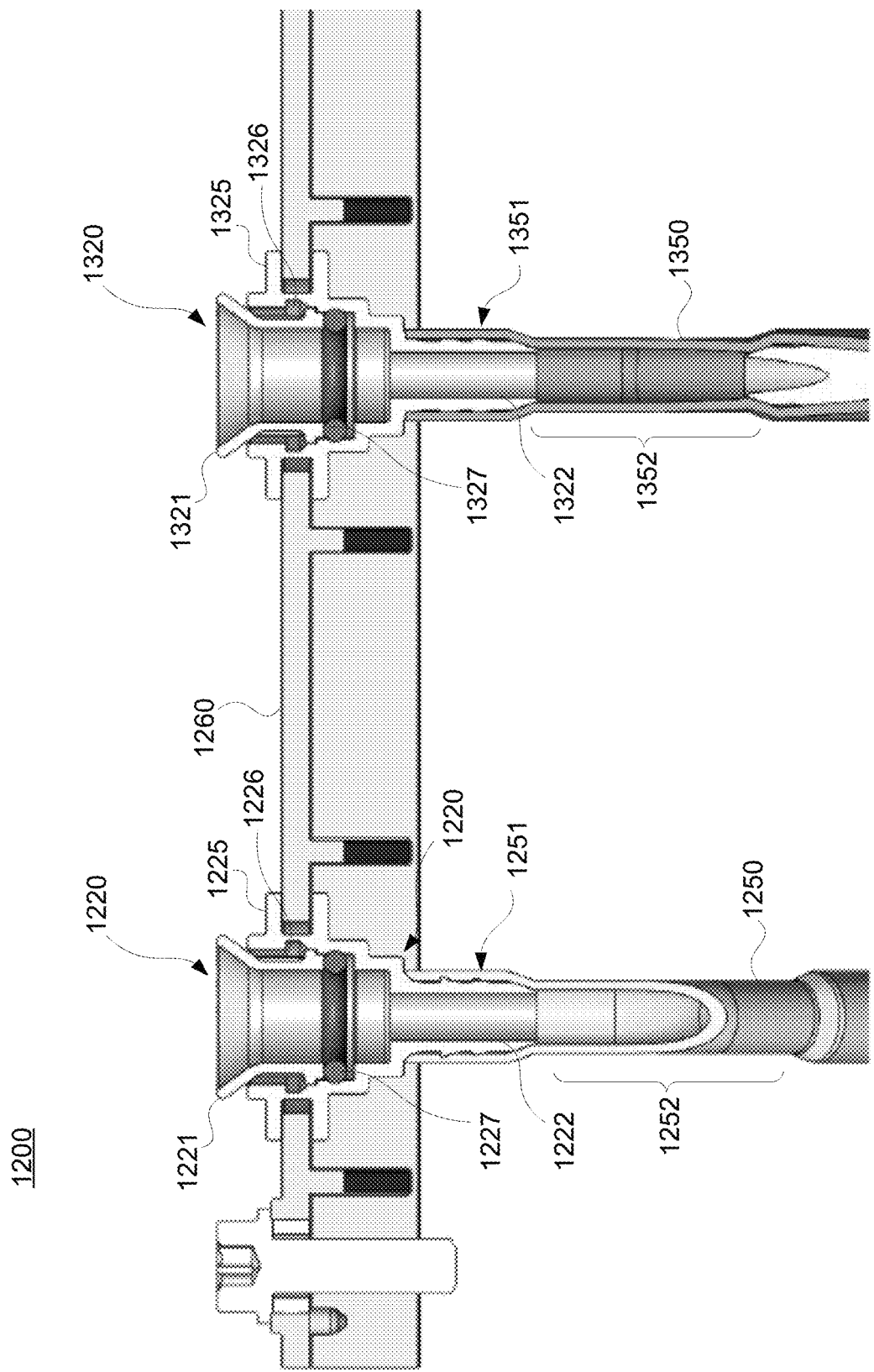
FIG. 14 shows a side cross-sectional view of the illustrative bracket with two mating connectors installed, and two fluid conduits of FIGS. 12-13, in accordance with some embodiments of the present disclosure.

FIG. 12 shows a perspective view of illustrative bracket 1260 with mating connectors 1220 and 1320 installed, and fluid conduits 1278 and 1279, in accordance with some embodiments of the present disclosure. FIG. 13 shows a perspective cross-sectional view of illustrative bracket 1260 with mating connectors 1220 and 1320 installed, and fluid conduits 1278 and 1279 of FIG. 12, in accordance with some embodiments of the present disclosure. FIG. 14 shows a side cross-sectional view of illustrative bracket 1260 with mating connectors 1220 and 1320 installed, and fluid conduits 1278 and 1279 of FIGS. 12-13, in accordance with some embodiments of the present disclosure.

Mating connector 1220 includes lead-in feature 1221, flange system 1225, seal 1227, extension 1222, and retainer 1226. Extension 1222 engages with end 1251 of tube 1250. Tube 1250 includes flexible section 1252, which may include a bellows, thinner wall, corrugations, any other suitable feature for imparting flexibility, or any combination thereof. Flange system 1225 engages with recess 1263 to form a planar slip system, in which mating connector 1220 may move laterally relative to bracket 1260. Recess 1263 includes a through recess larger than surface 1270 of mating connector 1220 to allow radial displacement. Recess 1263 also includes spring tabs configured to allow insertion of mating connector 1220 while constraining lateral movement.

Similarly, mating connector 1320 includes lead-in feature 1321, flange system 1325, seal 1327, extension 1322, and retainer 1326. Extension 1322 engages with end 1351 of tube 1350. Tube 1350 includes flexible section 1352, which may include a bellows, thinner wall, corrugations, any other suitable feature for imparting flexibility, or any combination thereof. Flange system 1325 engages with recess 1363 to form a planar slip system, in which mating connector 1320 may move laterally relative to bracket 1360. Recess 1263 includes a through recess larger than surface 1370 of mating connector 1320 to allow radial displacement. Recess 1363 also includes spring tabs configured to allow insertion of mating connector 1320 while constraining lateral movement.

Figure 15:
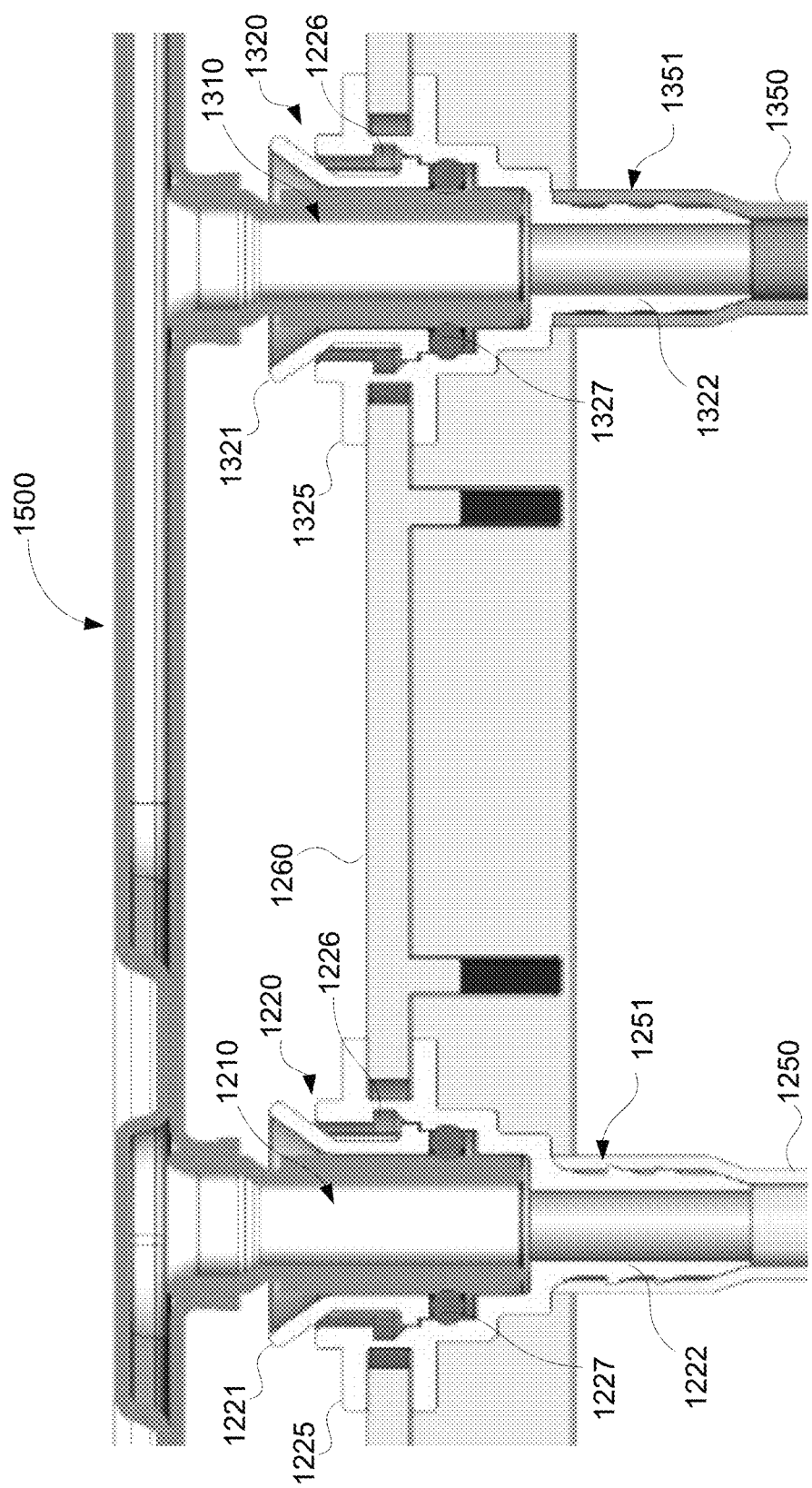
FIG. 15 shows a perspective cross-sectional view of the illustrative bracket, two mating connectors installed, and two fluid conduits of FIGS. 12-14, with fitting connectors installed, in accordance with some embodiments of the present disclosure.
Figure 16:
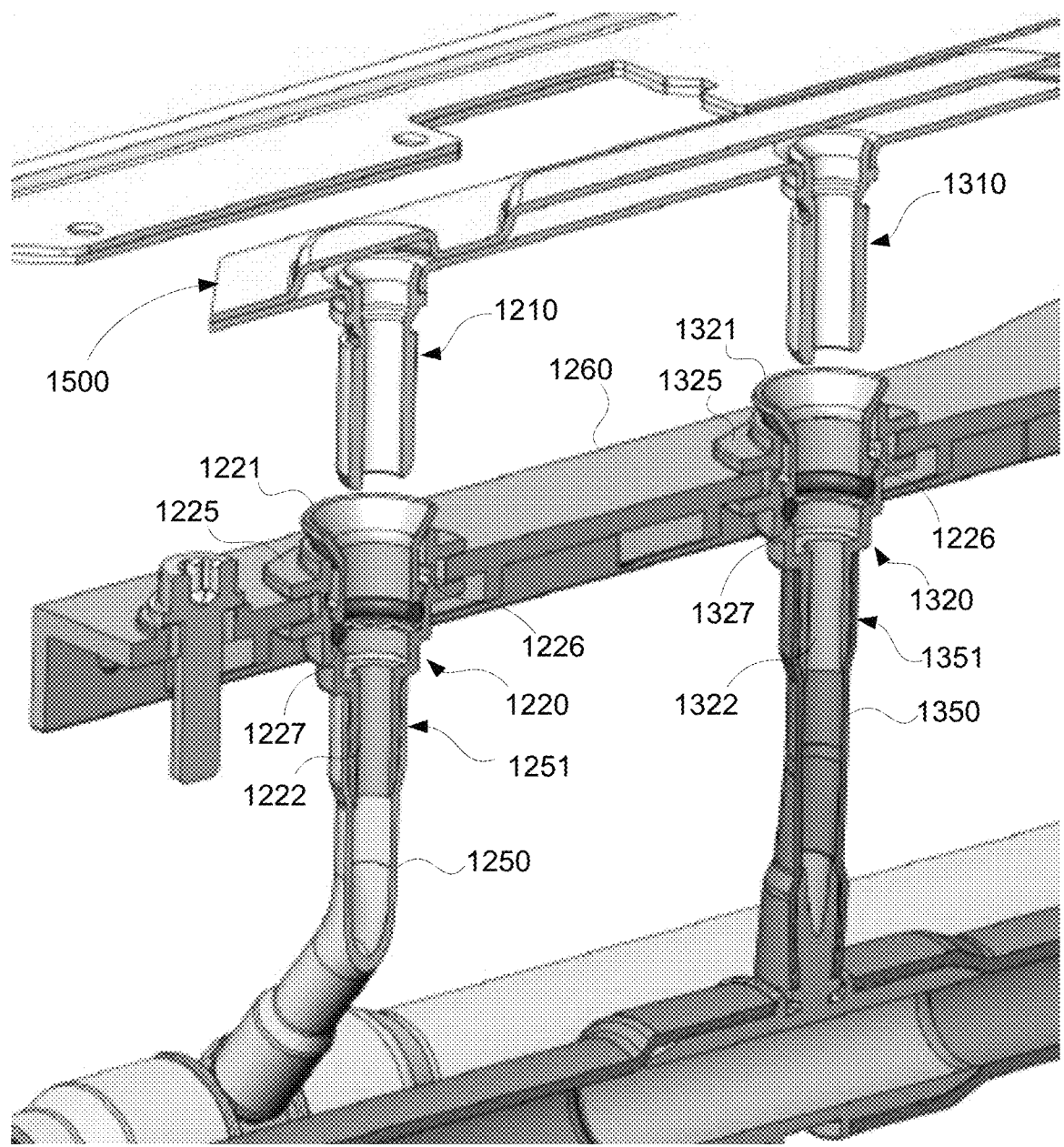
FIG. 16 shows a perspective cross-sectional view of the illustrative bracket, two mating connectors installed, and two fluid conduits of FIGS. 12-14, with fitting connectors arranged but not installed, in accordance with some embodiments of the present disclosure.

FIG. 15 shows a perspective cross-sectional view of illustrative bracket 1260, and mating connectors 1220 and 1320 installed of FIGS. 12-14, with fitting connectors 1210 and 1310 installed, in accordance with some embodiments of the present disclosure. FIG. 16 shows a perspective cross-sectional view of illustrative bracket 1260, and mating connectors 1220 and 1320 installed, with fitting connectors 1210 and 1310 arranged but not installed, in accordance with some embodiments of the present disclosure. Component 1500 includes fitting connectors 1210 and 1310, which are configured to blind mate to mating connectors 1220 and 1320, which are secured by bracket 1260.

Figure 17:
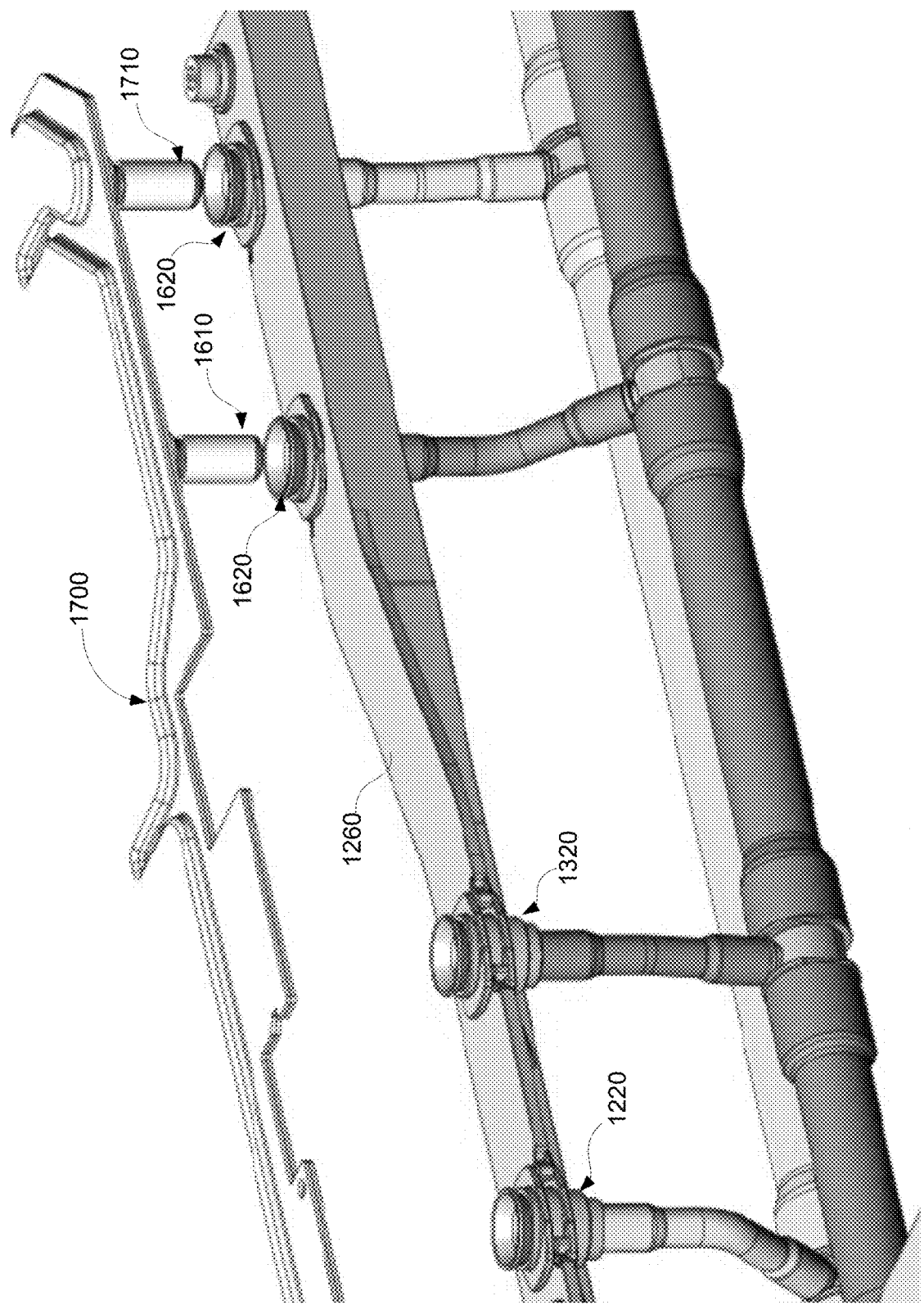
FIG. 17 shows a perspective view of an illustrative configuration similar to that of FIG. 16, in accordance with some embodiments of the present disclosure.

FIG. 17 shows a perspective view of a similar configuration to that of FIG. 16, in accordance with some embodiments of the present disclosure. In some embodiments, bracket 1260 is configured to secure mating connectors 1220, 1320, 1620, and 1720. Component 1700 includes fitting connectors 1610 and 1710, which are configured to engage with respective mating connectors 1620 and 1720. In an illustrative example, component 1700 and component 1500 may be installed simultaneously. In some embodiments, components 1500 and 1700 are cooling plates for battery modules installed adjacent to each other. In such embodiments, fluid conduit 1278 provides a supply of cooling fluid to the components 1500 and 1700 and fluid conduit 1279 provides a return path for the cooling fluid. In some embodiments, bracket 1260 is mounted to adjacent side walls within a battery pack.

FIGS. 18-22 illustrate another implementation of a connector system having aligning features that can be used for making blind or nearly blind connections, in accordance with some embodiments of the present disclosure.

Figure 18:
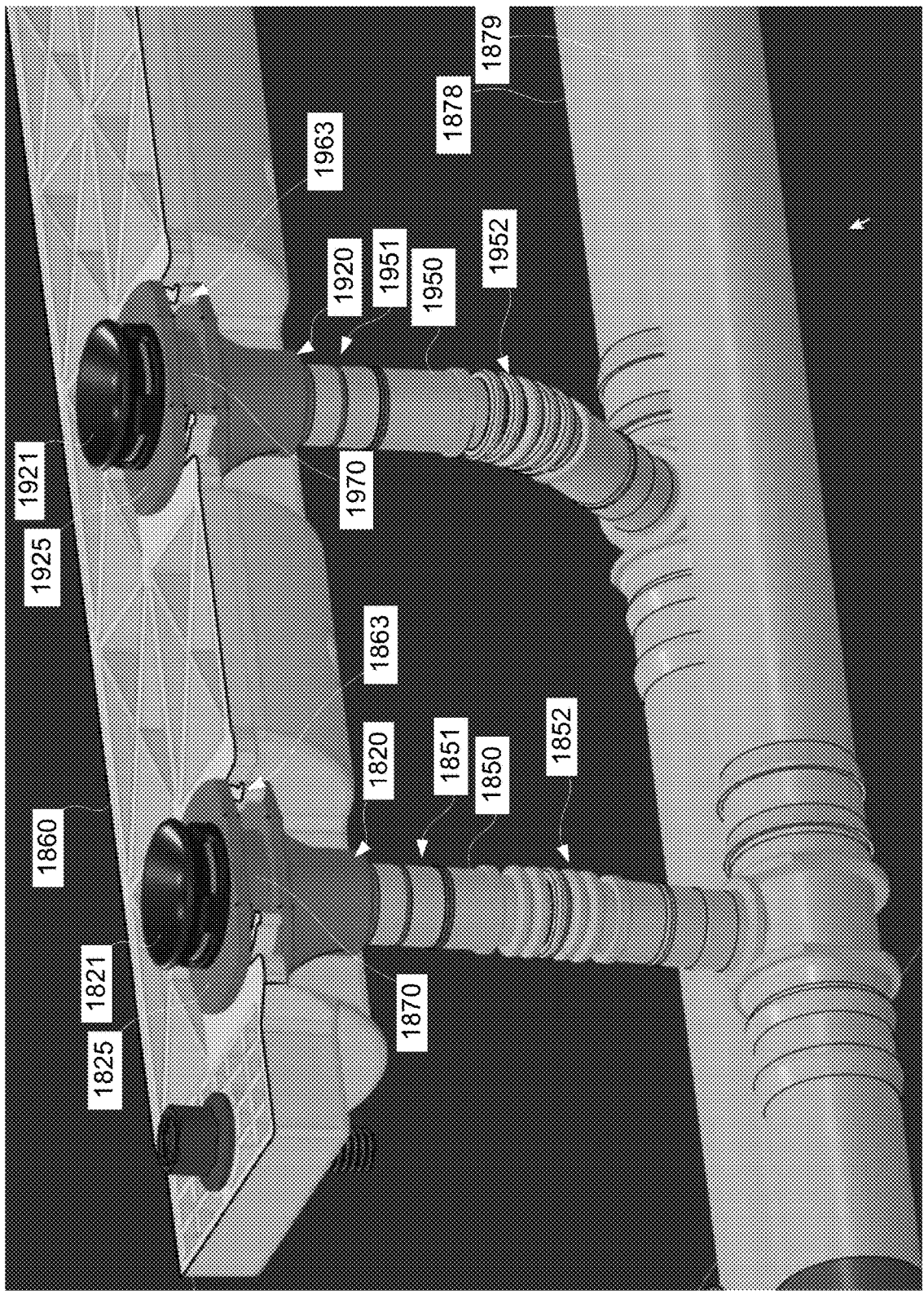
FIG. 18 shows a perspective view of an illustrative mount with two mating connectors installed, and two fluid conduits, in accordance with some embodiments of the present disclosure.
Figure 19:
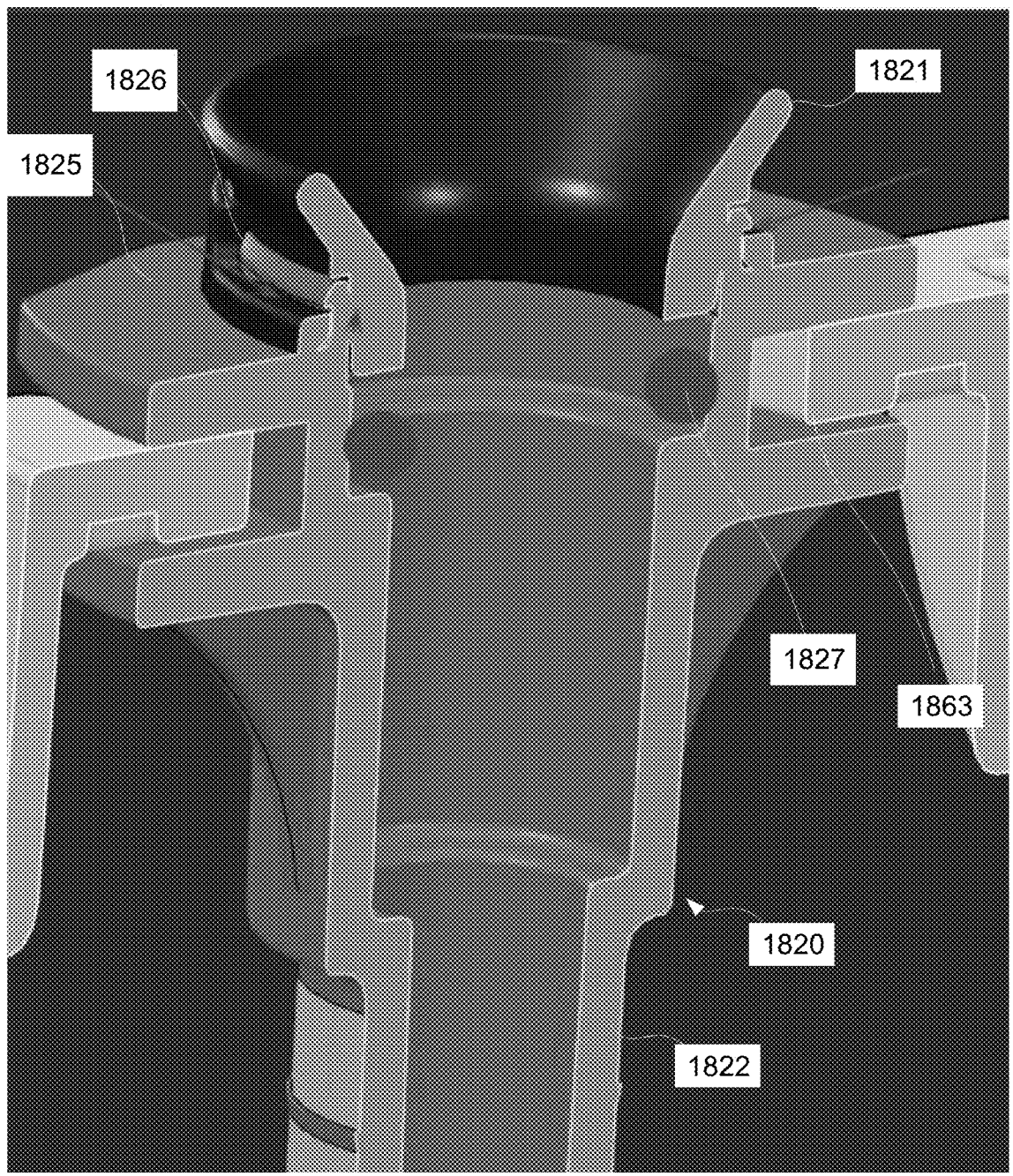
FIG. 19 shows a perspective cross-sectional view of one illustrative mating connector installed in the mount of FIG. 18, in accordance with some embodiments of the present disclosure.
Figure 20:
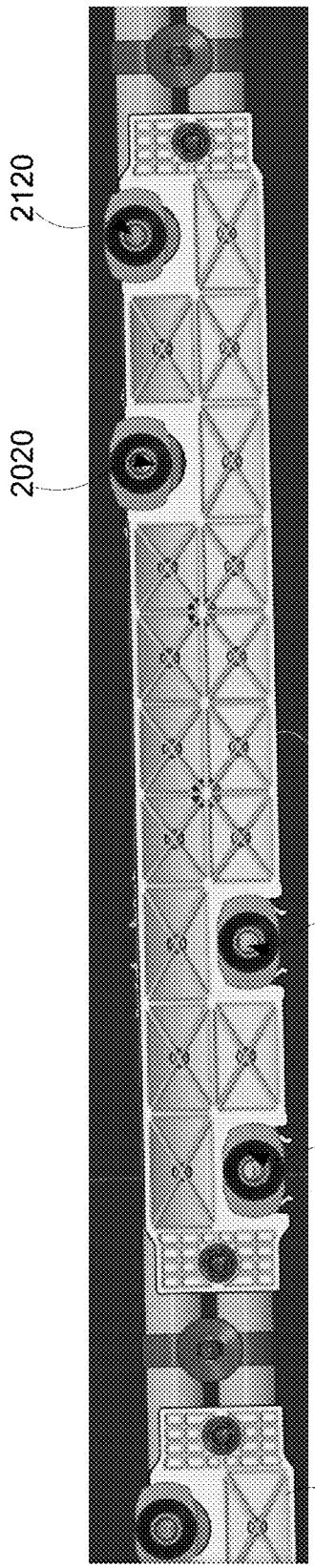
FIG. 20 shows a top view of the illustrative mount of FIGS. 18-19, with several mating connectors installed, in accordance with some embodiments of the present disclosure.
Figure 22:
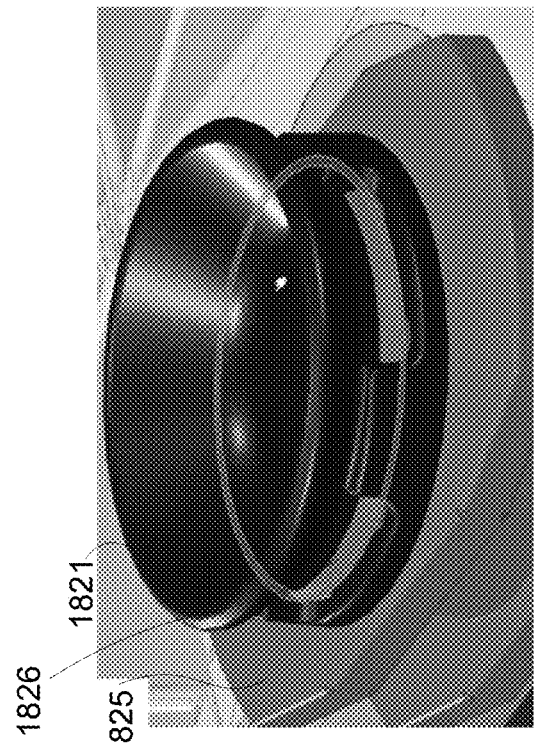
FIG. 22 shows a perspective view of a lead-in feature of one mating connector of FIG. 18, in accordance with some embodiments of the present disclosure.
Figure 21:
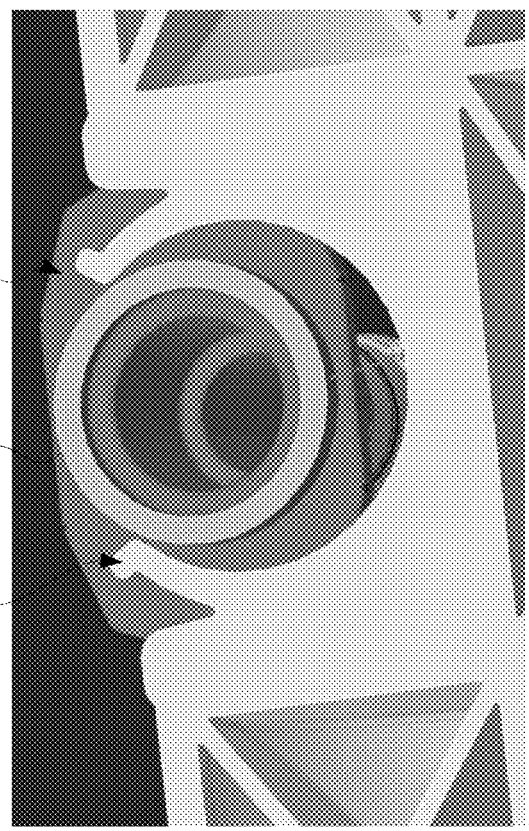
FIG. 21 shows a perspective cross-sectional view of one illustrative mating connector installed in the mount of FIGS. 18-20, forming a planar slip system, in accordance with some embodiments of the present disclosure.

FIG. 18 shows a perspective view of illustrative mount 1860 with mating connectors 1820 and 1920 installed, and fluid conduits 1878 and 1879, in accordance with some embodiments of the present disclosure. FIG. 19 shows a perspective cross-sectional view of illustrative mating connector 1820 installed in mount 1860 of FIG. 18, in accordance with some embodiments of the present disclosure. FIG. 20 shows a top view of illustrative mount 1860 of FIGS. 18-19, with mating connectors 1820, 1920, 2020, and 2120 installed, in accordance with some embodiments of the present disclosure. FIG. 21 shows a perspective cross-sectional view of illustrative mating connector 1820 installed in mount 1860 of FIGS. 18-20, forming a planar slip system, in accordance with some embodiments of the present disclosure. FIG. 22 shows a perspective view of lead-in feature 1821 of mating connector 1820 of FIG. 18, in accordance with some embodiments of the present disclosure.

Mating connector 1820 includes lead-in feature 1821, flange system 1825, seal 1827, extension 1822, and retainer 1826. Extension 1822 engages with end 1851 of tube 1850. Tube 1850 includes flexible section 1852, which includes a bellows, as illustrated. Flange system 1825 engages with recess 1863 to form a planar slip system, in which mating connector 1820 may move laterally relative to mount 1860. Recess 1863 includes a through recess larger than surface 1870 of mating connector 1820 to allow radial displacement. Recess 1863 also includes spring tabs configured to allow insertion of mating connector 1820 while constraining lateral movement.

Similarly, mating connector 1920 includes lead-in feature 1921, flange system 1925, seal 1927, extension 1922, and retainer 1926. Extension 1922 engages with end 1951 of tube 1950. Tube 1950 includes flexible section 1952, which includes a bellows, as illustrated. Flange system 1925 engages with recess 1963 to form a planar slip system, in which mating connector 1920 may move laterally relative to mount 1960. Recess 1963 includes a through recess larger than surface 1970 of mating connector 1920 to allow radial displacement. Recess 1963 also includes spring tabs configured to allow insertion of mating connector 1920 while constraining lateral movement.

As illustrated in FIG. 20, mount 1860 may be configured to secure a plurality of mating connectors (e.g., four as illustrated). A portion of additional mount 1960 is illustrated in FIG. 20, which may include a second plurality of mating connectors. Any suitable number of mounts, brackets, mating connectors, and fluid conduits may be included, in accordance with some embodiments of the present disclosure. In some embodiments, a crossmember of a battery pack is positioned between mounts 1860 and 1960. The crossmember includes a recess or an opening through which fluid conduits 1878 and 1979 pass. In some embodiments, mounts 1860 and 1960 extend between and are bolted to attachment points on adjacent crossmembers of the battery pack. As depicted, mount 1860 is an injection molded part, which reduces the cost and the number of parts needed as compared, for example, to the mounts of FIGS. 1-9.

As illustrated in FIG. 21, surface 1870 and recess 1863 form a planar slip system, wherein mating connector 1820 can undergo displacement in the lateral plane within recess 1863. Flexible section 1852 of tube 1850 allows mating connector 1820 to more freely move in the lateral plane by having a stiffness that does not significantly constrain displacement.

As illustrated in FIG. 22, retainer 1826 is configured to retain lead-in feature 1821 against flange system 1825. For example, as contrasted with mating connector 1220 of FIGS. 12-17, mating connector 1820 allows seal 1827 to more fully seal against a fitting connector (e.g., seal 1827 is positioned axially further from the end of the fitting connector).

Use of the blind mate fluid connector system may facilitate an increase in manufacturing density, such as by increasing battery packaging density. This may allow fluid connections such as coolant manifold connections on bottom of the battery pack where hand and tool access are not feasible. Moreover, the present disclosure may be applied to other blind assembly situations, such as for the main battery pack inlet and outlet connections as well such that when installing the battery pack into the vehicle chassis from the bottom the fluid connectors self-align for connection and sealing.

An exemplary fitting connector such as a fitting pin may have a suitable shape such as a cylindrical shape, although other shapes (e.g., oval, rectangular with inwardly tapered exterior edges, etc.) may be utilized in accordance with the present disclosure. The exterior surface of the fitting connector may define an exterior mating surface that engages with an interior mating surface of the mating connector. A fluid passage may provide a passage for a fluid (e.g., coolant) to and/or from a suitable component or system (e.g., a battery module). An upper portion of the fitting pin may be fixedly attached to the component or system while a lower portion of the fitting pin may be tapered to engage with a tapered surface of the mating connector.

Although the present disclosure has been described in the context of a fitting connector having an exterior surface that engages with an interior surface of a mating connector to form the fluid passage, in an embodiment the fitting connector may have an interior surface that engages with an interior surface of the mating connector to form the fluid passage. In such an embodiment the tapered (e.g., cone) surface may guide the exterior surface of the mating connector to engage with the interior surface of the fitting connector in response to a downward force. The tapered surface may also exert a normal force on the mating connector to cause movement within the plane that is perpendicular to the downward force. The mating connector may maintain features such that moves radially upon the platform in response to the normal force, as described herein.

In some embodiments, the planar slip system may be associated with the fitting connector (e.g., the connector of the battery module that is being "inserted" into the battery frame) rather than the mating connector (e.g., the connector that is fixed to the battery frame that is receiving the fitting connector). In some embodiments, both the mating connector and the fitting connector may have an associated planar slip system such that each may move within the plane. The designs (e.g., materials, mating components, etc.) may be such that the coefficient of friction associated with the respective slip system may be different, e.g., such that a first of the slip systems associated with a first of the connectors allows movement first until the force reaches a certain threshold or the first slip system reaches a limit of movement, after which the second slip system permits movement.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A fluid mating system, comprising:
a fitting connector comprising an exterior mating surface and a first interior fluid passage that permits fluid flow along a first direction; and
a mating connector comprising:
an exterior contact surface comprising a planar bottom surface;
an interior surface, wherein the interior surface includes a lead-in portion and an interior mating surface, wherein the lead-in portion is tapered toward the interior mating surface such that the diameter of the lead-in portion decreases toward the interior mating surface, and wherein the interior mating surface defines a cavity to engage with the exterior mating surface; and
a second interior fluid passage that permits fluid flow in the first direction, wherein the first interior fluid passage and the second interior fluid passage comprise a single fluid path when the interior mating surface is engaged with the exterior mating surface; and
a planar slip system, wherein the planar slip system comprises a platform comprising a planar seating surface that restricts movement of the mating connector in the first direction and allows at least partial free movement of the mating connector within a plane that is perpendicular to the first direction, and wherein the planar bottom surface is arranged between the planar seating surface and the lead-in portion.

2. The fluid mating system of claim 1, wherein the exterior mating surface defines a first cylindrical surface and wherein the interior mating surface defines a second cylindrical surface, and wherein a diameter of the second cylindrical surface is greater than a diameter of the first cylindrical surface.

3. The fluid mating system of claim 2, wherein the lead-in surface defines a partial cone surface, wherein the partial cone surface has a major diameter at an outer edge of the partial cone surface and a minor diameter at an inner edge of the partial cone surface.

4. The fluid mating system of claim 3, wherein a difference between the major diameter and the minor diameter is greater than a radius of the first cylindrical surface.

5. The fluid mating system of claim 3, wherein a difference between the major diameter and the minor diameter is less than a radius of the first cylindrical surface.

6. The fluid mating system of claim 3, wherein each of a center axis of the first cylindrical surface, a center axis of the second cylindrical surface, and a center axis of the partial cone surface, define an axis along the first direction.

7. The fluid mating system of claim 6, wherein the inner edge of the partial cone surface corresponds to an initial opening of the interior mating surface, and wherein the minor diameter is equal to the diameter of the second cylindrical surface.

8. The fluid mating system of claim 1, wherein the engagement between the interior mating surface and the exterior mating surface comprises a slip fit.

9. The fluid mating system of claim 1, wherein the engagement between the interior mating surface and the exterior mating surface comprises a press fit.

10. The fluid mating system of claim 1, wherein the engagement between the interior mating surface and the exterior mating surface creates a seal for the single fluid path.

11. The fluid mating system of claim 10, further comprising an O-ring located between the interior mating surface and the exterior mating surface to create the seal for the single fluid path.

12. The fluid mating system of claim 1, wherein the platform further comprises an interior contact surface that allows the at least partial free movement of the mating connector within the plane that is perpendicular to the first direction based on the relative shapes of the interior contact surface and the exterior contact surface.

13. The fluid mating system of claim 12, wherein the exterior mating surface defines a first cylindrical surface, and wherein each of the interior contact surface and the exterior contact surface define a cylindrical surface.

14. The fluid mating system of claim 13, wherein a difference between the diameter of the interior contact surface and the exterior contact surface is greater than a radius of the first cylindrical surface.

15. The fluid mating system of claim 13, wherein a difference between the diameter of the interior contact surface and the exterior contact surface is less than a radius of the first cylindrical surface.

16. The fluid mating system of claim 12, wherein the exterior contact surface defines an exterior surface of a rigid tube that extends below the planar seating surface and includes the second interior fluid passage.

17. The fluid mating system of claim 16, further comprising a flexible fluid tube coupled to the rigid tube.

18. The fluid mating system of claim 12, wherein the mating connector comprises a first lip that is seated on the planar seating surface, wherein the exterior contact surface is an exterior surface of the first lip, wherein the platform comprises a second lip, and wherein the interior contact surface is an interior surface of the second lip.

19. The fluid mating system of claim 12, further comprising a retaining component that retains the mating connector on the planar seating surface of the platform.

20. The fluid mating system of claim 19, wherein the retaining component comprises a retaining clip that applies a force to the mating connector along the first direction towards the planar seating surface of the platform.

21. The fluid mating system of claim 19, wherein the retaining clip is detachably affixed to the platform and is seated over at least a portion of the mating connector.

22. The fluid mating system of claim 12, further comprising a fixed mounting bracket, wherein the platform is fixedly attached to the fixed mounting bracket along the plane.

23. The fluid mating system of claim 22, wherein the platform is fixedly attached to the fixed mounting bracket by a snap fit between one or more snaps of the platform and one or more through holes of the fixed mounting bracket.

24. The fluid mating system of claim 1, wherein the at least partial free movement of the mating connector within a plane comprises linear movement in at least one direction.

25. The fluid mating system of claim 1, wherein the at least partial free movement of the mating connector within a plane comprises radial movement in any direction.

\* \* \* \* \*